(12) United States Patent
Estan et al.

(10) Patent No.: US 7,962,434 B2
(45) Date of Patent: Jun. 14, 2011

(54) EXTENDED FINITE STATE AUTOMATA AND SYSTEMS AND METHODS FOR RECOGNIZING PATTERNS IN A DATA STREAM USING EXTENDED FINITE STATE AUTOMATA

(75) Inventors: Cristian Estan, Madison, WI (US);
Randy David Smith, Madison, WI (US);
Somesh Jha, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 618 days.

(21) Appl. No.: 12/032,380

(22) Filed: Feb. 15, 2008

(65) Prior Publication Data
US 2009/0106183 A1   Apr. 23, 2009

Related U.S. Application Data

(60) Provisional application No. 60/890,136, filed on Feb. 15, 2007.

(51) Int. Cl.
*G06F 17/00* (2006.01)
(52) U.S. Cl. .......................................................... 706/47
(58) Field of Classification Search .................... 706/20, 706/45–48, 12, 62; 726/11, 13, 14, 22–26
See application file for complete search history.

(56) References Cited

U.S. PATENT DOCUMENTS

| | | | | |
|---|---|---|---|---|
| 7,685,254 | B2 * | 3/2010 | Pandya | 709/217 |
| 2006/0136570 | A1 * | 6/2006 | Pandya | 709/217 |
| 2007/0038798 | A1 * | 2/2007 | Bouchard et al. | 711/3 |

OTHER PUBLICATIONS

Kumar, et al., Algorithms to Accelerate Multiple Regular Expressions Matching for Deep Packet Inspection, ACM, 2006SIGCOMM'06, Sep. 11-15, 2006, pp. 339-350.*
Alfred V. Aho et. al., "Efficient string matching: An aid to bibliographic search", Communications of the ACM, Jun. 1975.
Fang Yu, et al., "Fast and memory-efficient regular expression matching for deep packet inspection", Technical Report EECS-2005-8, U.C. Berkeley, 2005.
Michael Spergberg-McQueen, "Notes on finite state automata with counter", www.w3.org/XML/2004/05/msm-cfa.html, (available at least as early as May 2004).
M. Roesch, "Snort—lightweight intrusion detection for networks", Proceedings of the 13th Systems Administration Conference, USENIX, 1999.
"Programming techniques: Regular expression search algorithm", K. Thompson, Commun.ACM, 11(6):419-422, 1968.
M. Fisk et al., "Fast Content-Based Packet Handling for Intrusion Detection", TR CS 2001-0670, UC San Diego, May 2001.

(Continued)

*Primary Examiner* — David R Vincent
(74) *Attorney, Agent, or Firm* — Boyle Fredrickson, S.C.

(57) ABSTRACT

Deterministic finite automata (DFAs) are popular solutions to deep packet inspection because they are fast and DFAs corresponding to multiple signatures are combinable into a single DFA. Combining such DFAs causes an explosive increase in memory usage. Extended finite automata (XFAs) are an alternative to DFAs that avoids state-space explosion problems. XFAs extend DFAs with a few bytes of "scratch memory" used to store bits and other data structures that record progress. Simple programs associated with automaton states and/or transitions manipulate this scratch memory. XFAs are deterministic in their operation, are equivalent to DFAs in expressiveness, and require no custom hardware support. Fully functional prototype XFA implementations show that, for most signature sets, XFAs are at least 10,000 times smaller than the DFA matching all signatures. XFAs are 10 times smaller and 5 times faster or 5 times smaller and 20 times faster than systems using multiple DFAs.

21 Claims, 14 Drawing Sheets

OTHER PUBLICATIONS

H. Sengar et al., "VoIP Intrusion Detection Through Interacting Protocol State Machines", DSN, Jun. 2006.

Fang Yu et al., "Gigabit Rate Packet Pattern-Matching Using Tcam", ICNP, Oct. 2004.

* cited by examiner

```
XFA_COMBINE(XFA first, XFA second):

1  worklist WL
2  XFA c
3  c.addState (< first.start, second.start >)
4  c.setStart (< first.start, second.start >)
5  WL ← { < first.start, second.start >) }
6  while ( |WL| > 0) do
7  │  < s,t > ← WL.pop ()
8  │  foreach (β∈Σ) do
9  │  │  s' = first.getNextSt( s ,β )
10 │  │  t' = second.getNextSt( t ,β )
11 │  │  if < s',t'> ∉ c.states then
12 │  │  │  c.addState (< s', t' >)
13 │  │  │  < s',t' > .instrs.append (s' .instrs)
14 │  │  │  < s',t' > .instrs.append (t' .instrs)
15 │  │  │  WL.push ( < s', t' > )
16 │  │  c.addTrans ( < s,t >,<s', t' >, β )
17 return c
```

*FIG. 10*

```
    XFA_APPLY(XFA M, first, unsigned char* buf, int len:

1   state* curState = M.start
2   execInstrs ( curState→instrs )
3   for i ← 0 to len do
4   |   curState = curState→nextState( buf [i] )
5   |   execInstrs ( curState→instrs )
    |   // Check the offset list
6   |   while ( offsetList→head.offset==i ) do
7   |   |   execInstrs ( offsetList→head→instr )
8   |   |_  offsetList→head = offsetList→head.next
```

*FIG. 11*

```
    TEST (S ∈ Σ*):

1   q ← q_0 ;

2   d ← d_0 ;

3   foreach s ∈ S do
4   |   q ← σ (q, s) ;
5   |_  d ← U (q, d);

6   if q ∈ F and c(q, d) then
7   |   return Accept 8   else
9   |   return Reject
```

*FIG. 12*

```
FIND_EQUIVALENT (XFA M):

1  for c_1 ← 1 to numCounters do
2    for c_2 ← c_1 + 1 to numCounters do
3      compatible = true
4      foreach state s ∈ M.states do
5        if areCompat( s, c_1, c_2) == FALSE then
6          compatible = false 7      if compatible then
8        mark (c_1, c_2) as reducible 9  foreach reducible counter pair (c_i, c_j) do
10   foreach state s ∈ M.states do
11     op = getReduced (s, c_i, c_j)

12   combine counters c_i and c_j, keeping operation op
```

EXTENDED FINITE STATE AUTOMATA AND SYSTEMS AND METHODS FOR RECOGNIZING PATTERNS IN A DATA STREAM USING EXTENDED FINITE STATE AUTOMATA

This application claims priority to U.S. Provisional Patent Applications 60/890,136 and 61/022,993, each of which is incorporated herein by reference in its entirety. The subject matter of this application was made with U.S. Government support, awarded by the following agencies: National Science Foundation, grant numbers 0716538 and 0546585. The United States has certain rights to this application.

STATEMENT REGARDING FEDERALLY SPONSORED RESEARCH OR DEVELOPMENT

This invention was made with United States government support awarded by the following agency:
NSF 0546585 and 0716538
The United States government has certain rights in this invention.

BACKGROUND

1. Field of the Invention

This invention is directed to finite state automata and using such finite state automata to recognize patterns in data.

2. Related Art

Deep packet inspection is becoming prevalent for modern networking devices as they inspect packet payloads for a variety of reasons. Payloads are matched against signatures of vulnerabilities to detect or block intrusions. Application recognition, used for accounting and traffic policing, also increasingly relies on inspecting packet contents. Often, load balancing is done based on application layer protocol fields. Implementing such deep packet inspection at the high speeds of today's networks is one of the hardest challenges facing the manufacturers of network equipment. One type of deep packet inspection operation which is critical for intrusion detection and/or prevention systems (IPSes) is signature matching.

The move from simple string based signatures to more complex regular expressions has turned signature matching into one of the most daunting deep packet inspection challenges. To achieve good matching throughput, IPSes typically represent the signatures as deterministic finite automata (DFAs) or nondeterministic or (NFAs). Both types of automata allow multiple signatures to be matched in a single pass. However, DFAs and NFAs present different memory vs. performance tradeoffs. DFAs are fast and large, whereas NFAs are smaller but slower. Measurements by the inventors confirm that DFAs recognizing signature sets currently in use exceed feasible memory sizes, while NFAs are typically hundreds of times slower than DFAs.

Combining the DFAs for each of the individual signatures into a single DFA usable to recognize a signature set often results in a state space explosion. For example, the size of the minimal DFA that recognizes multiple signatures of the type ".*$a_i$.*$b_i$", where "$a_i$" and "$b_i$" are distinct strings, is exponential in the number of signatures. Less memory suffices when using multiple DFAs because the extent of the state space explosion is smaller. NFAs avoid state space explosion entirely. However, they are less efficient because, for every input byte, the NFA has to track a set of automaton states.

String matching was important for early network intrusion detection systems, as the signatures consisted of simple strings. The Aho-Corasick algorithm, which is disclosed in Alfred V. Aho et. al., "Efficient string matching: An aid to bibliographic search", Communications of the ACM, June 1975, builds a concise automaton that recognizes multiple different ones of such signatures in a single pass. This automaton is linear in the total size of the strings. Other conventional software and hardware solutions to the string matching problem have also been proposed. Some of these solutions also support wildcard characters. However, evasion techniques made it necessary to use signatures that cover large classes of attacks but still make fine enough distinctions to eliminate false positives. Consequently, the last few years have seen signature languages evolve from exploit-based signatures that are expressed as strings to richer session signatures and vulnerability-based signatures. These complex modern signatures can no longer be expressed as strings or strings with wildcards. As a result, regular expressions are used instead.

NFAs represent regular expressions compactly but may require large amounts of matching time, since the matching operation needs to explore multiple paths in the automaton to determine whether the input matches any signatures. In software, this is usually performed via backtracking, which renders the NFA vulnerable to algorithmic complexity attacks, or by maintaining and updating a "frontier" of states. Unfortunately, both of these solutions can be computationally expensive. While hardware-implemented NFAs can parallelize the processing required and thus achieve high speeds, software implementations of NFAs have significant processing costs. One known NFA hardware architecture efficiently updates the set of states during matching.

DFAs can be efficiently implemented in software. However, DFAs have a state space explosion problem that makes it infeasible to build a DFA that matches all signatures of a complex signature set. On-the-fly determinization has been proposed for matching multiple signatures. This approach maintains a cache of recently visited states and computes transitions to new states as necessary during inspection. This approach has good performance in the average case, but can be subverted by an adversary who can repeatedly invoke the expensive determinization operation.

Fang Yu, et al., "Fast and memory-efficient regular expression matching for deep packet inspection", Technical Report EECS-2005-8, U.C. Berkeley, 2005 (hereafter "Yu"), discloses a solution that offers intermediary tradeoffs by using multiple DFAs to match a signature set. Each of these DFAs recognizes only a subset of the signatures and all DFAs need to be matched against the input. Yu proposes combining signatures into multiple DFAs instead of one DFA, using simple heuristics to determine which signatures should be grouped together. This approach reduces the total memory footprint, but for complex signature sets, the number of resulting DFAs can itself be large. Additionally, this approach results in increased inspection time, since payloads must now be scanned by multiple DFAs.

The $D^2FA$ technique disclosed in S. Kumar, et al., "Algorithms to accelerate multiple regular expressions matching for deep packet inspection", Proceedings of the ACM SIGCOMM, September 2006, addresses memory consumption by reducing the memory footprint of individual states. It stores only the difference between transitions from similar states, and relies on some hardware support for fast matching. The technique does not address the state space explosion problem.

Other extensions to automata have been proposed. In the context of XML parsing, Michael Spergberg-McQueen, "Notes on finite state automata with counter", www.w3.org/

XML/2004/05/msm-cfa.html, (available at least as early as May 2004), discloses counter-extended finite automata (CFAs). CFAs are nondeterministic and have the same performance problems as NFAs. Extended Finite State Automata (EFSA) that extend a traditional finite state automaton with the ability to assign and examine values of a finite set of variables have been used in the context of information security. EFSAs have been used to monitor a sequence of system calls, and to detect deviations from expected protocol state for VoIP applications. Extensions, such as EFSA, fundamentally broaden the language recognized by the finite-state automata, i.e., EFSAs correspond to regular expression for events (REEs).

SUMMARY OF THE DISCLOSED EMBODIMENTS

A new type of Finite State Automata (FSAs), eXtended Finite Automata (XFAs), according to this invention, provide an alternate representation for signatures with memory requirements similar to NFAs and with a matching speed that approaches DFAs. XFAs extend DFAs by introducing a small "scratch memory" holding bits, counters and/or other appropriate data structures that are manipulated by simple programs attached to the transitions and/or the states of the XFA and executed whenever the annotated transitions are traversed and/or whenever the annotated states are reached. By using bits, counters and/or other appropriate data structures to independently record the progress in matching various signatures, XFAs largely avoid the state space explosion problem inherent in combining DFAs. A fully functional XFA prototype has been built and has been evaluated using signature sets from the Snort Network Intrusion Detection System, disclosed in M. Roesch, "Snort—lightweight intrusion detection for networks", Proceedings of the 13$^{th}$ Systems Administration Conference, USENIX, 1999, and from the Cisco Intrusion Prevention System (IPS).

Systems and methods according to this invention provide extended finite automata (XFAs).

Systems and methods according to this invention separately provide XFAs that are usable during deep packet inspection.

Systems and methods according to this invention separately provide XFAs that provide signature representation usable by an IPS.

Systems and methods according to this invention separately provide fully functional XFAs, including algorithms for matching, combining, and verifying XFAs.

Systems and methods according to this invention separately provide algorithms based on optimization techniques from compilers that reduce the memory usage and run time of XFAs recognizing multiple signatures.

An XFA operates similarly to a DFA. However, an XFA keeps a small amount of "scratch memory" that persists as the XFA moves from state to state. This scratch memory holds one or more data structures, such as, for example, one or more counters, one or more independently-set bits, and/or any other appropriate data structures that can be used to track progress in recognizing signatures or other types of data patterns. In various exemplary embodiments, various transitions in an XFA are provided with, i.e., annotated with, small programs that update at least some of the variables in scratch memory. In various other exemplary embodiments, various states in an XFA are provided or annotated with small programs that update at least some of the variables in scratch memory. An XFA recognizes its corresponding signature when it reaches an accepting state, but only if the values in the scratch memory also match an "acceptance condition".

XFAs can represent combined signatures more compactly than DFAs because they separate information about progress in matching signatures into distinct bits, counters and/or other appropriate data structures that can be updated independently, whereas DFAs need to keep explicit states for many possible interleavings of the subpatterns of various signatures.

Deep packet inspection required by network devices, such as intrusion detection systems, is becoming a performance bottleneck. Deterministic finite automata (DFAs) are a popular solution to this problem because they are fast and because it is possible to combine the DFAs corresponding to multiple signatures into a single DFA. However, combining DFAs recognizing complex signatures leads to an explosive increase in memory usage. To counter this effect, current systems use multiple DFAs each recognizing a subset of the signatures and each is matched separately against the traffic. In contrast, extended finite automata (XFAs) are an alternative to DFAs that avoid state space explosion problems. XFAs extend DFAs with a few bytes of "scratch memory" used to store bits, counters and/or other data structures that record progress. Simple programs associated with automaton transitions and/or states manipulate this scratch memory. XFAs are deterministic in their operation, are equivalent to DFAs in expressiveness, and require no custom hardware support. Measurements from using fully functional prototype XFA implementations show that, for most signature sets, XFAs are at least tens of thousands of times smaller than the DFA matching all signatures. Compared to various configurations using multiple DFAs, the prototype XFAs are 10 times smaller and 5 times faster or 5 times smaller and 20 times faster.

These and other features and advantages of various exemplary embodiments of systems and methods according to this invention are described in, or are apparent from, the following detailed descriptions of various exemplary embodiments of various devices, structures and/or methods according to this invention.

BRIEF DESCRIPTION OF DRAWINGS

Various exemplary embodiments of the systems and methods according to this invention will be described in detail, with reference to the following figures, wherein:

FIG. 10 shows one exemplary embodiment of a method according to this invention for combining two XFAs;

FIG. 11 shows one exemplary embodiment of a method according to this invention for matching an XFA against a packet payload or buffer of bytes;

FIG. 12 shows one exemplary embodiment of a method according to this invention for matching an XFA against a string S;

DETAILED DESCRIPTION OF EXEMPLARY EMBODIMENTS

Figure 1:
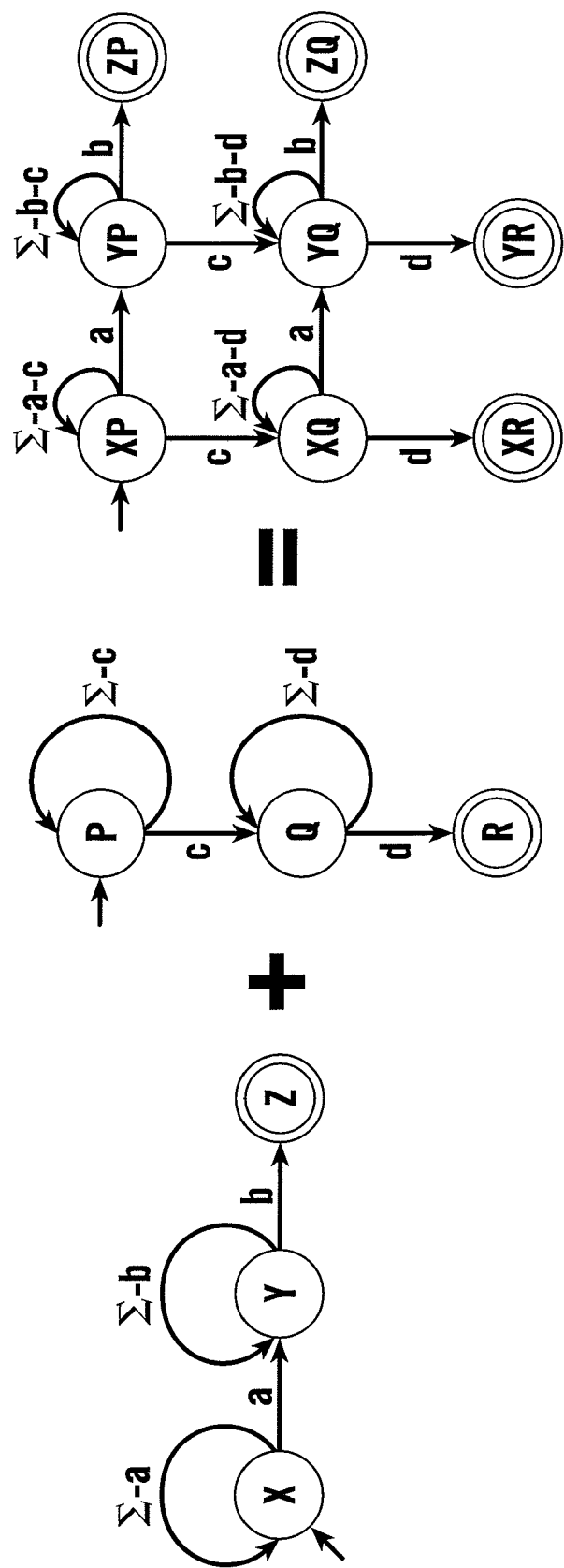
FIG. 1 shows one exemplary embodiment of the combined DFA for expressions ".*a.*b" and ".*c.*d", which uses states to "remember" which subpatterns have occurred.

The magnitude of DFA state space explosion depends strongly on the types of patterns being tracked. For example, in the case of strings, the number of states required to recognize n signatures is bounded by the total size of the strings, or O(n) if the size of the largest string is bound. Other types of patterns, such as those in FIGS. 1 and 2, can cause the number of states to increase exponentially and quadratically, respectively, in the number of signatures. For example, FIG. 1 shows the combined DFA for expressions ".*a.*b" and ".*c.*d". The DFA of FIG. 1 uses states to "remember" which subpatterns have occurred. It should be appreciated that for simplicity, some transitions or edges have been omitted. Similarly, in FIG. 2, the combined DFA for expressions ".*\na[^\n]{200}" and ".*bc" replicates the second expression 200 times, once for each repetition of the first expression. Again, it should be appreciated that, for simplicity, some transitions or edges have been omitted.

When XFAs recognizing individual signatures are combined, no state space explosion takes place like in the case when DFAs recognizing the same signatures are combined. The reason for this is not the procedure for combining the XFAs, which is an extension of the procedure combining DFAs. In fact, the scratch memory of the XFAs does not influence in any way the shape of the underlying automaton for the combined XFA. The reason why the combined XFA is smaller than the combined DFA is that the shape of the underlying automata for the XFAs is different. These different shapes do not lead to state space explosion because when the XFAs are combined, they have benign interactions just as DFAs that perform string matching (i.e. recognize .*S). The scratch memory for the XFAs is important because it allows the XFAs to correctly implement complex signatures. That is, even though the underlying automata are very similar to those performing string matching, because of the use of scratch memory, they can recognize complex signatures such as those shown in the examples set forth herein.

FIGS. 1-4 and the following detailed description of those figures, including Definitions 1.1 and 1.2, are directed to a first exemplary embodiment or type of an XFA according to this invention, where the states are extended according to this invention. In contrast, FIGS. 5-8 and the following detailed description of those figures, including Definitions 2.1 and 2.2, are directed to a second exemplary embodiment or type of an XFA according to this invention, where the transitions (or edges), as well as some of the states, are extended according to this invention.

In such a state-based XFA, the XFA instructions associated with (or attached to) a given state are executed whenever that given state is entered, independent of the transition traversed to reach that given state. In such a transition-based XFA, the XFA instructions associated with (or attached to) a given transition are executed whenever that given transitions is traversed, without regard to the states located at the beginning or end of that given transition. Similarly, instructions associated with or attached to a state are executed when that state is reached. The instructions act to either trigger alerts signaling that the input matches the signatures tracked, and/or to update the data structures in scratch memory. For state-based XFAs, both types of instructions are associated with some states of the automaton. For transition-based XFAs the first type of instructions are associated with some states and the second type with some transitions. It should be appreciated that transition-based and state based instructions of the first type can be incorporated in a single XFA.

Thus, in the state-based XFA, if a given state has a plurality of incoming transitions, the instructions attached to that state will be executed and the memory structures update when that state is reached, regardless of the incoming transition that was traversed to reach that state. In contrast, in the transition-based XFA, if a given state has a plurality of outgoing transitions, the instructions that will be executed upon leaving that state will depend on the particular transition that is traversed as that state is exited. That is, whenever a state is entered, if it has instructions associated with it, those instructions are executed. Whenever a transition is used to move from one state to another, if the transition has instructions associated with it, those instructions are executed. It should be appreciated that the number of transitions entering or exiting given states does not necessarily affect the selection of instructions to be executed.

Figure 5:
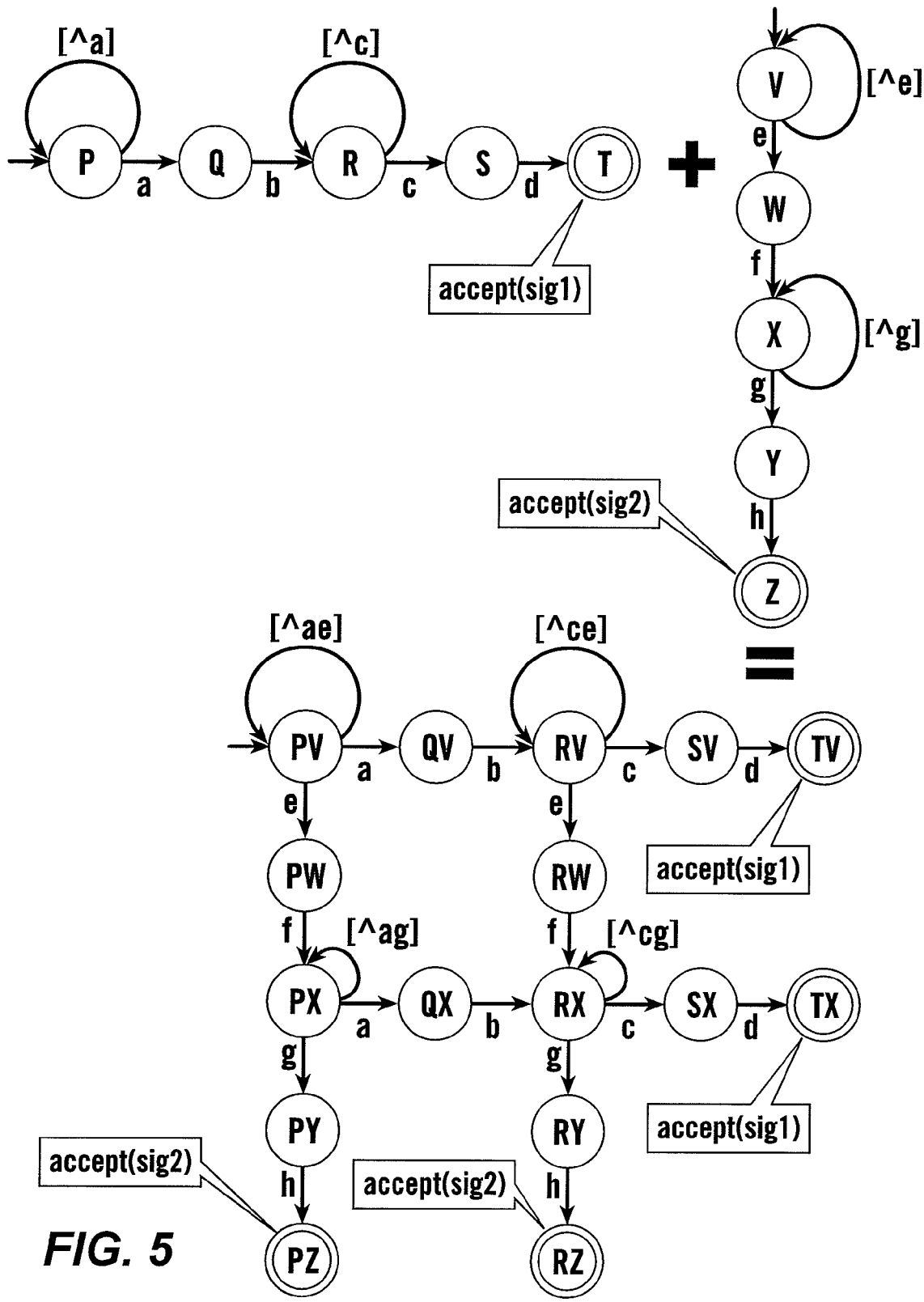
FIG. 5 shows one exemplary embodiment of the combined DFA for expressions ".*ab.*cd" and "*ef.*gh", which has state space blowup.

Recognizing a signature set with n signatures of the form .*$s_i$.*$s'_i$, where all $s_i$ and $s'_i$ are distinct strings, leads to state space blowup with DFAs. FIGS. 1 and 5 show how signatures of the form ".*$s_1$.*$s_2$" can cause state space explosion. Signatures such as ".*$s_1$.*$s_2$" should be read as "a first subpattern, followed by an arbitrary number of characters, followed by a second subpattern." For each signature of this type, the combined DFA needs to remember whether it has already seen the first subpattern, so that the combined DFA knows whether or not to accept the second subpattern. If there are n distinct such subpatterns, the DFA will need at least 2n states to remember what subset of these distinct subpatterns have appeared in the input.

Figure 2:
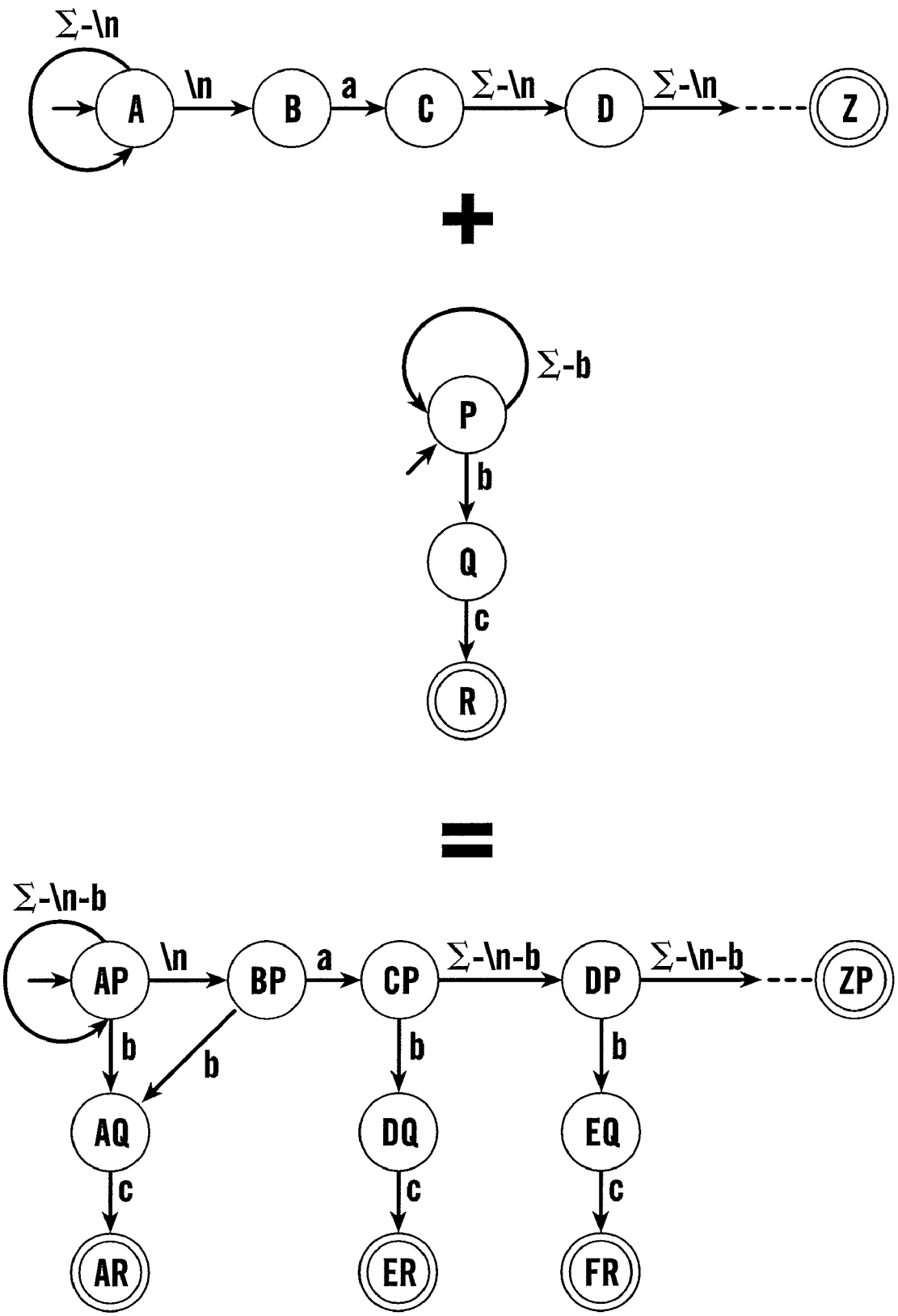
FIG. 2 shows one exemplary embodiment of a combined DFA for expressions ".*\na[^\n]{200}" and ".*bc", which replicates the second expression 200 times, once for each repetition.

FIG. 2 shows two sources of state space explosion in signatures commonly used to detect overflow attacks in text based protocols: ".*\ns$_1$[^\n]{k}", which should be read as "newline followed by a subpattern followed by k non-newline characters". The first problem is that the DFA must count up to k non-newline characters using a string of k states. The second problem occurs when this signature is combined with simple string-based signatures. In such cases, the combined DFA needs to concurrently track two independent things: how far along it is in matching this signature and its progress in recognizing strings, which can occur at any offset. This requires O(nk) states to track a single such signature and n strings and O(n$^2$k) states to track n such signatures and n strings.

Figure 3:
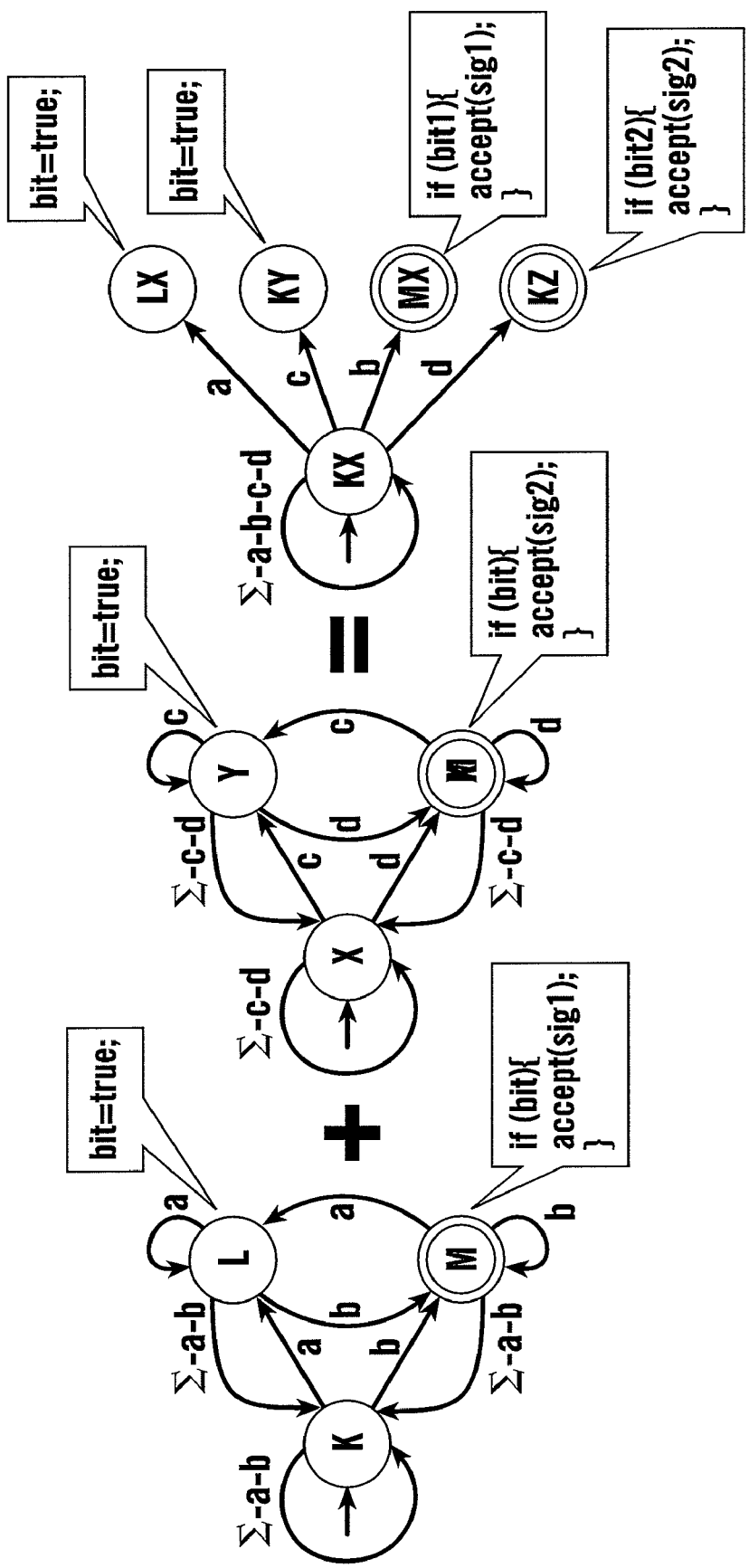
FIG. 3 shows one exemplary embodiment of a state-based XFA according to this invention that, by using bits associated with states to remember subpattern occurrences, has required fewer states than the corresponding DFA shown in FIG. 1.

FIG. 3 shows how state-based XFAs can avoid the state space explosion for signatures of the type shown in FIG. 1. In this example, each state-based XFA uses one bit of scratch memory that is set whenever the first subpattern is recognized. In the accepting states, each state-based XFA recognizes its signature only if its bit is set. When many such state-based XFAs are combined, the state-based XFA uses one separate bit for each distinct subpattern to remember whether various subpatterns have been recognized. While this leads to larger scratch memory requirements, the state space grows linearly rather than exponentially. As shown in FIG. 3, by using bits to remember subpattern occurrences, the combined state-based XFA requires fewer states than the combined DFA shown in FIG. 1. It should be appreciated that, in the DFA shown in FIG. 1, the back transitions or edges to state KX and other transitions or edges have been removed for clarity.

Figure 4:
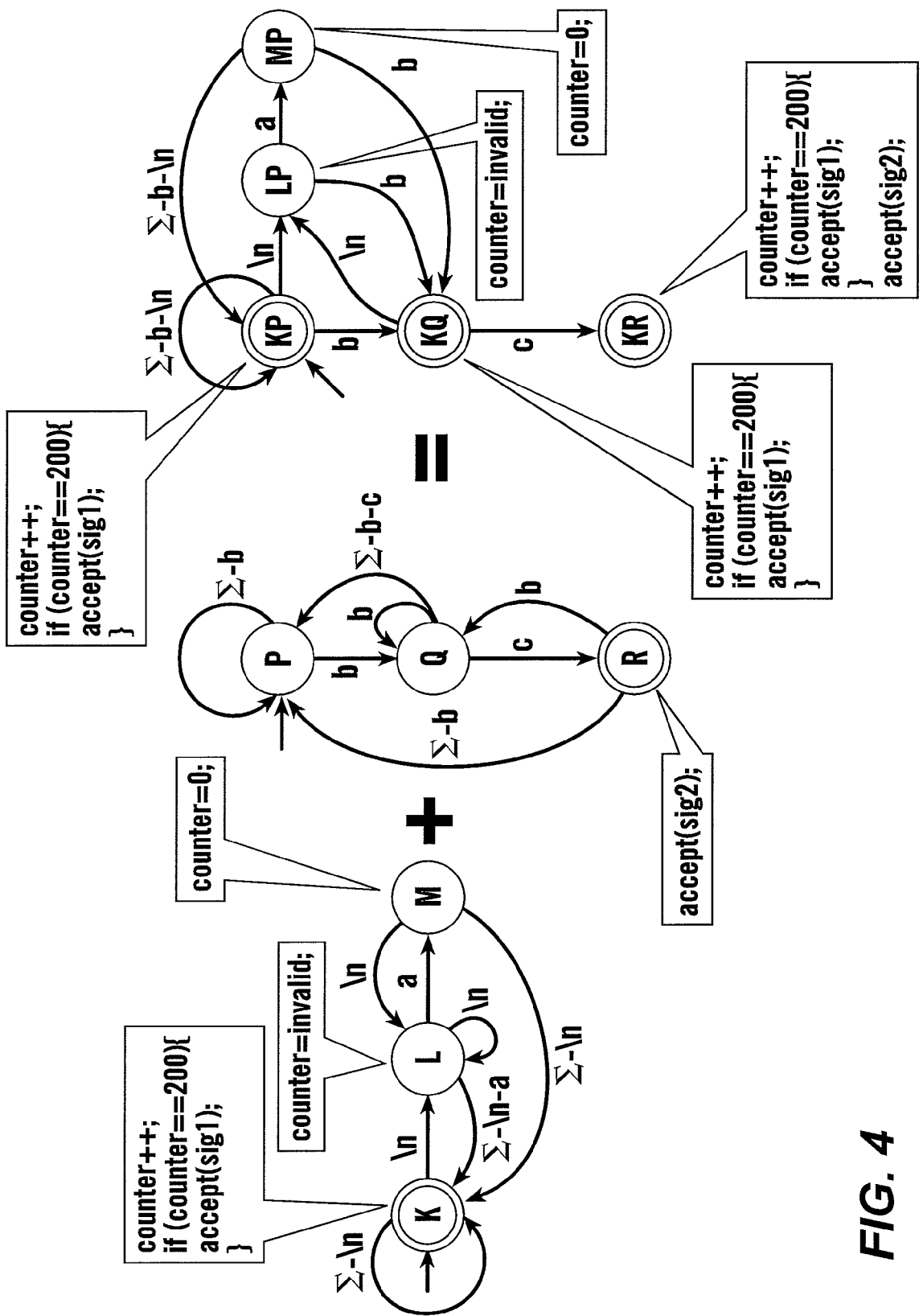
FIG. 4 shows one exemplary embodiment of an XFA according to this invention that, by substituting a counter associated with states for explicit counting states, avoids replicating ".*bc" as in the DFA shown in FIG. 2.

FIG. 4 presents an example of a combined state-based XFA that avoids the state space explosion for signatures of the type shown in FIG. 2. It should be appreciated that only the automaton for the first signature is different. Here, the sequence of 200 states is replaced by a counter. When the combined state-based XFA shown in FIG. 4 recognizes the starting subpattern "\na" in the input string at a given state M, the counter is initialized to 0. The counter is then incremented for every input character until it reaches 200, at which point the combined state-based XFA shown in FIG. 4 accepts the starting subpattern "\na".

If the combined state-based XFA shown in FIG. 4 sees a newline character after the counter was initialized but before accepting the input, this combined state-based XFA transitions to state L, where the program invalidates the counter. Alternatively, as outlined below with respect to FIGS. 5-8, for a program associated with a transition instead of a state, the counter is invalidated as the XFA transitions to state L (i.e., as it traverses the edge between K and L or M and L). Combining such state-based XFAs with those recognizing strings leads to no explosion in state space. Similarly to FIG. 3, substituting a counter in the combined state-based XFA shown in FIG. 4 for explicit counting states in the DFA shown in FIG. 2 allows the combined state-based XFA shown in FIG. 4 to avoid replicating ".*bc" when the component state-based XFAs are combined. It should be appreciated that some transitions or edges have been omitted from the rightmost automaton shown in FIG. 4.

Definition 1.1 An extended state-based nondeterministic finite automaton (XNFA), i.e., an XNFA of the first exemplary type, is denoted by a 9-tuple (Q, Σ, δ, Q$_0$, F, D, d$_0$, R, c), where:

Q is the set of states, Σ is the set of inputs, Q$_0$ ⊆ Q is the set of initial states, F ⊆ Q is the set of final states, $\overline{\delta}$ is a function from Q×(Σ ∪ ε) to $\overline{2^Q}$.

D is a finite data domain, d$_0$ ∈ D is the initial value,

R is the update relation and is a map from S to $2^{D \times D}$, and c is the acceptance condition and is a map from D to {0,1}.

It should be appreciated that a state-based XNFA has four more components than a NFA. An XNFA should be viewed as a NFA with a global variable v whose value is drawn from the finite domain D. Initially, the state-based XNFA is in a state q$_0$ ∈ Q$_0$, with the value of the variable v as d$_0$. For each state q ∈ Q, R(q) denotes the allowable changes to the global variable in state q, i.e., if the state-based XNFA is in state q, the value of global variable v is d, and (d, d') ∈ R(q), then the value of v can be updated to d' in the next state. The last component c of an XNFA is called the acceptance condition, i.e., a string σ ∈ Σ* is accepted by the state-based XNFA if there exists a path from a initial state q$_0$ ∈ Q$_0$ to a final state q$_i$ ∈ F, which is labeled with σ and the global variable v has value d after an update in the final state q$_i$ such that c(d)=1.

A state-based XNFA is equivalent to a NFA because the value of the global variable can always be incorporated into the state. Let XF=(Q, Σ, δ, Q$_0$, F, D, d$_0$, R, c) be a state-based XNFA. The corresponding NFA M$_{XF}$=(Q×D, Σ, δ', Q'$_0$, F') is defined as:

δ is a function from (Q×D)×(Σ ∪ ε) to $2^{Q \times D}$, where given a state (q, d) ∈ Q×D and a α ∈ Σ ∪ ε, (q', d') ∈ δ'((q, d), α) iff q' ∈ δ(q, α) and (d, d') ∈ R(q).

The set Q'$_0$ is equal to Q$_0$×{d$_0$}.

A state (q, d) ∈ F' iff q ∈ F and c(d)=1.

It is easy to see that a string σ is accepted by a state based XNFA XF if and only if it is also accepted by the corresponding NFA M$_{XF}$. Therefore, the language L(XF) accepted by a state-based XNFA XF is equal to the language L(M$_{XF}$) accepted by the corresponding NFA M$_{XF}$.

Definition 1.2 A deterministic state-based extended finite automaton (XFA), i.e., an XFA of the first exemplary type, is denoted by a 9-tuple (Q, Σ, δ, q$_0$, F, D, d$_0$, R, c), where:

Q is the set of states, Σ is the set of inputs, q$_0$ ∈ Q is the initial state, F ⊆ Q is the set of final states, δ is a function from Q×Σ to Q.

D is a finite data domain, d$_0$ ∈ D is the initial value,

R is the update function and is a map from S to $D^D$, and c is the acceptance condition and is a map from D to {0,1}.

The data domain D is the set of all possible values of the scratch memory and d$_0$ is the value that the scratch memory is initialized to. The update function U represents the programs associated with the automaton states. For each possible combination of an automaton state and a value, U defines the new value to be stored in the scratch memory. The acceptance condition c specifies for which combinations of final states and data values that the XFA will accept. The method or algorithm for applying the XFA to an input is presented below in FIG. 12.

FIG. 5 shows an exemplary DFA similar to the DFA shown in FIG. 1, where n=2, s$_1$=ab, s'$_1$=cd, s$_2$=ef, and s'$_2$=gh. As indicated above with respect to FIG. 1, for each of the n signatures, the combined DFA must "remember" whether it already found the first string in the input so that it "knows" whether to accept if it sees the second string. To remember n independent bits of information, the DFA needs at least $2^n$ distinct states. In FIG. 5, when the DFA is in state PV, it "knows" that the input processed so far does not contain ab or ef. In contrast, when the DFA shown in FIG. 5 is in state RV, the input processed so far contains ab but not ef, when the DFA is in state PX, the input processed so far contains ef but not ab, and when the DFA is in state RX, the input processed so far contains both ab and ef. A closer analysis of the general example shows that, if the strings are of length l, the actual number of states used by the combined DFA is $O(nl2^n)$.

Figure 6:
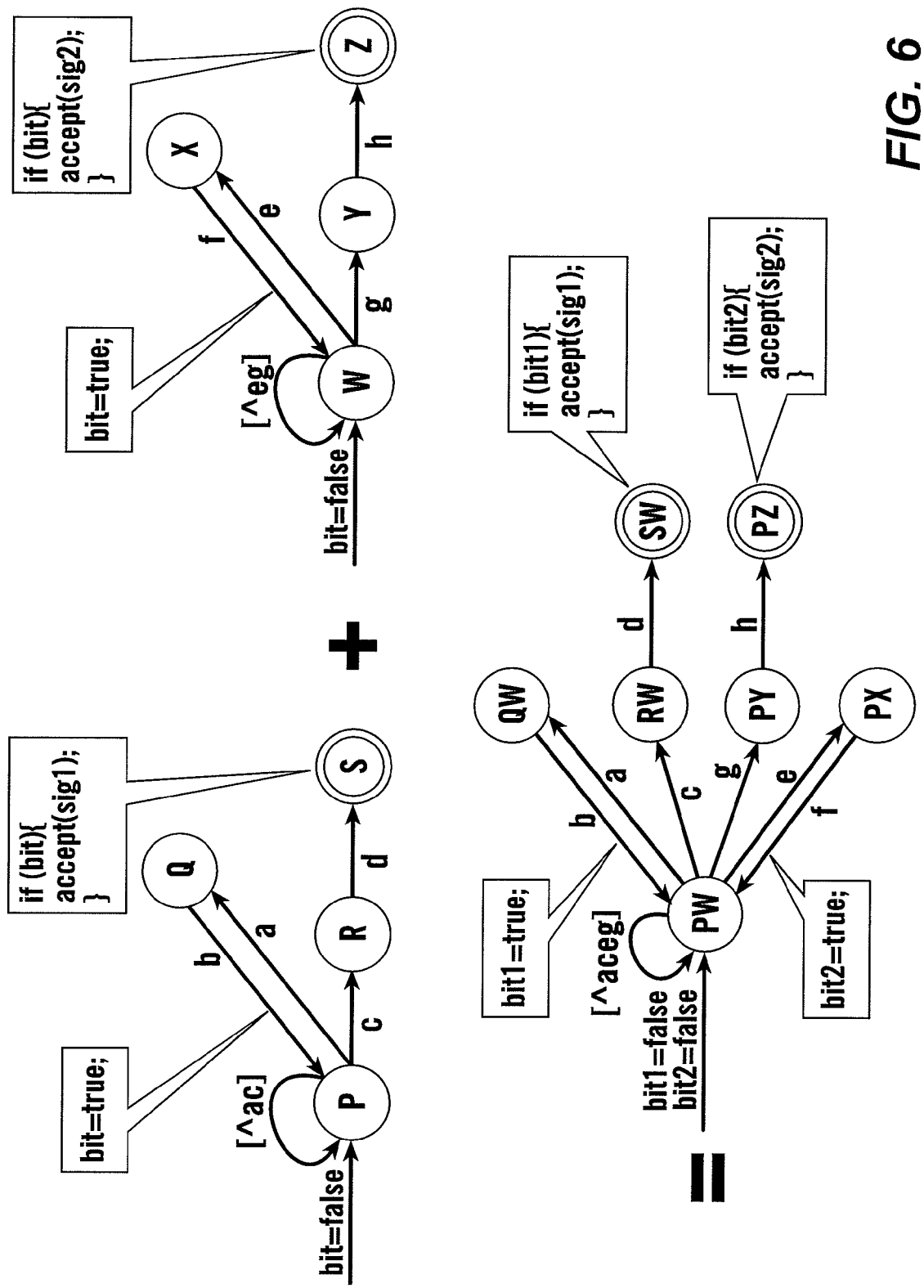
FIG. 6 shows one exemplary embodiment of a transition-based XFA according to this invention that, by using bits associated with transitions to remember subpattern occurrences, requires fewer states than the corresponding DFA shown in FIG. 5.

FIG. 6 shows the same signatures as in FIG. 5, but with the DFAs being replaced with transition-based XFAs, i.e., second exemplary type XFAs. In FIG. 6, the transition-based XFAs for ".*ab.*cd" and ".*ef.*gh" each use a single bit of scratch memory that is manipulated by instructions attached to specific transitions or edges. In the transition-based XFAs shown in FIG. 6, these instructions are illustrated as callout boxes. During matching, these instructions are executed each time the transition or edge to which they are attached is traversed. For each signature of the form .*$s_i$.*$s'_i$, as long as $s_i$ does not overlap with $s'_i$, a transition-based XFA similar to those in FIG. 6 can be built that uses a single bit of scratch memory. This bit explicitly encodes whether $s_i$ has appeared in the input so far. Moreover, the shape of the underlying automaton is very similar to that of the combined DFA recognizing .*$s_i$, and .*$s'_i$ independently. The combined XFA for the entire signature set uses n bits and O(nl) states. Of course, if $s_i$ and $s'_i$ overlap, it is still possible to build a transition-based XFA recognizing the signature, but that transition-based XFA will have to use more than one bit of scratch memory.

Thus, as shown in FIG. 6, by adding n bits of scratch memory, a combined transition-based XFA that is approximately $2^n$ times smaller than the combined DFA shown in FIG. 5 can be obtained. However, it should be appreciated that, while the processing time is reduced, the initialization time goes up from O(1) to O(n). Similarly, assuming that the strings in the signatures are not suffixes of each other, only a small constant is added to the worst-case per-byte processing cost, as at most one bit is updated for any given byte from the input.

Figure 7:
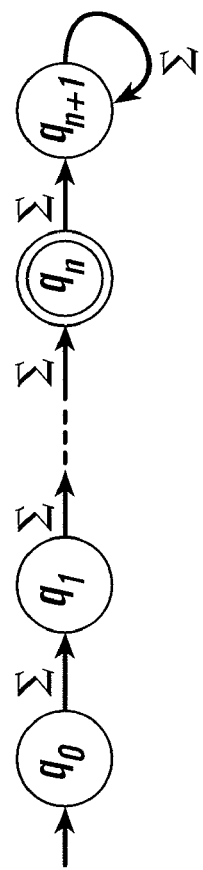
FIG. 7 shows one exemplary embodiment of a DFA that recognizes the string ".{n}"
Figure 8:
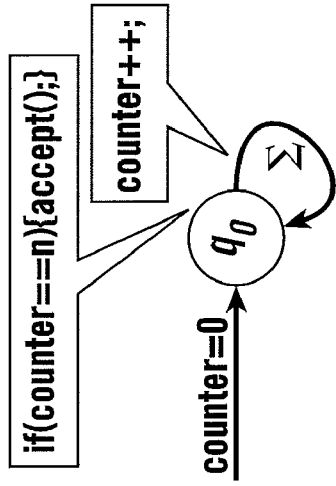
FIG. 8 shows one exemplary embodiment of a transition-based XFA according to this invention that, by substituting a counter associated with the transitions between the single state and an acceptance condition associated with that single state, requires fewer states than the corresponding DFA shown in FIG. 7.

Transition-based XFAs can provide large reductions in the number of states even when recognizing individual signatures. FIGS. 7 and 8 show another exemplary DFA and a corresponding transition-based XFA, respectively, that each recognize the language defined by ".{n}", which consists of all strings of length n. While no NIDS signatures have this exact form, signatures detecting buffer overflows use sequences of states similar to those in FIG. 7 to count the number of characters that follow a given keyword. The minimal DFA for .{n} needs n+2 states, while the corresponding transition-based XFA uses a single state and a counter. This counter is initialized to 0 and is incremented on every transition. The transition-based XFA shown in FIG. 8 accepts the input string only if the value of the counter is n. The counter only needs to count from 0 to n+1. When the counter has value n+1 and it is incremented, it stays n+1. Thus, the counter needs to take only n+2 values, so it needs $k=\lceil \log_2(n+2) \rceil$ bits of scratch memory. By adding k bits of scratch memory, the number of states is reduced by a factor of close to $2^k$. If run time is measured in bit operations, the initialization cost and the per byte processing increase from O(1) to O(k). In contrast, if run time is measured in instructions, a small constant is added to both the initialization cost and the per byte processing.

It should be appreciated that the scratch memory used by transition-based XFAs is represented as a finite data domain D. Any configuration of the scratch memory that is possible during matching is represented as a data value $d \in D$. Each transition is associated with an update function $U: D \rightarrow D$ (or, for non-deterministic XFAs, with an update relation $U \subset D \times D$), which specifies how d is to be updated. For the common special case where the data domain not updated by a transition, the identity function is associated with such transitions. Since the automaton is extended with the data value, the current state of the computation is no longer fully described by the current state of the automaton $q \in Q$, but by a "current configuration" of the automaton, $(q, d) \in Q \times D$. Similarly, the acceptance condition is not defined as a subset of states, but as a subset of configurations $F \subset Q \times D$. It should be appreciated that this definitions of transition-based XFAs set forth above generalizes the standard DFA definition.

In various exemplary embodiments according to this invention, a transition-based extended finite automaton (XFA) is defined by a 7-tuple $(Q,D,\Sigma,\delta,U_\delta,(q_0,d_0),F)$.

Definition 2.1 An extended transition-based deterministic finite automaton (XFA), i.e., an XFA of the second exemplary type, is denoted by a 7-tuple $(Q,D,\Sigma,\delta,U_\delta,(q_0,d_0),F)$, where:

Q is the set of states, $\Sigma$ is the input alphabet, and $\delta: Q \times \Sigma \rightarrow Q$ is the transition function;

D is the finite set of values in the data domain, $U_\delta: Q \times \Sigma \times D \rightarrow D$ is the per transition update function which defines how the data value is updated on every transition, (q0, d0) is the initial configuration which consists of an initial state q0 and an initial data value d0, and $F \subset Q \times D$ is the set of accepting configurations.

Nondeterministic transition-based XFAs (XNFAs) differ from deterministic transition-based XFAs in a number of important ways. For example, XNFAs replace deterministic transitions with non-deterministic transitions, they define $\epsilon$ transitions, and instead of update functions, each transition has an update relation that can take a data domain value to multiple values. Furthermore, instead of an initial configuration (q0, d0), XNFAs have a set of initial configurations $QD_0$.

Definition 2.2 An extended transition-based nondeterministic finite automaton (XNFA), i.e., an XNFA of the second exemplary type, is denoted by a 7-tuple $(Q,D,\Sigma,\delta,U_\delta,QD_0,F)$, where:

Q is the set of states, $\Sigma$ is the input alphabet, and $\delta \subset: Q \times (\Sigma \cup \{\epsilon\}) \times Q$ is the nondeterministic relation describing the allowed transitions;

D is the finite set of values in the data domain, $U_\delta: \delta \rightarrow 2^{D \times D}$ is the nondeterministic update function (or update relation) that defines how the data value is updated on every transition, $QD_0 \subset Q \times D$ is the set of initial configurations of the NXFA, and $F \subset Q \times D$ is the set of accepting configurations.

During the construction procedure for transition-based XFAs, the data domain D is represented explicitly as a set of integers, the per transition update functions $U_\delta$ are represented as unstructured sets of pairs $(d_i, d_j)$, and F is represented as a set of configurations. These are intermediate representations. The final transition-based XFA that performs the signature matching uses a much more compact representation. In this more compact representation, D is not represented explicitly, and small programs are associated with states and transitions. Thus, the amount of memory required is not much larger than that for a DFA based on Q and $\delta$. These data domains used by the final XFAs during matching are referred to herein as "efficiently implementable data domains" (EIDDs).

Figure 9:
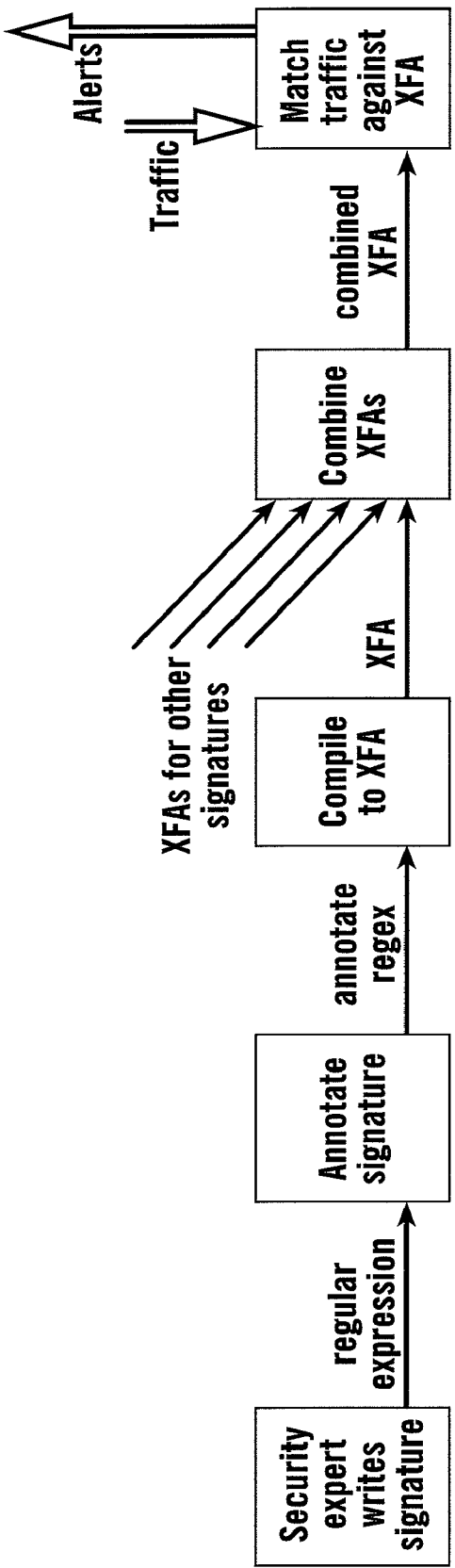
FIG. 9 is a block diagram illustrating one exemplary method for converting NIDS signatures into an XFA and for using that XFA to monitor network traffic.

FIG. 9 is a block diagram illustrating the steps involved in constructing transition-based or state-based XFAs and using such XFAs according to this invention in a NIDS. The first step of crafting the NIDS signatures is outside the scope of this disclosure, as no changes to the semantics of the signatures are required to implement the XFAs according to this invention. Rather, the XFAs according to this invention change to how such NIDS signatures are represented during matching. As shown in FIG. 9, a set of regular expressions for complex NIDS signatures are first extended by adding annotations to some or all of the regular expressions that indicate when to use scratch memory operations. Then, each regular expression is converted or compiled into a state-based and/or transition-based XFA that recognizes the language defined by that regular expression. In this case, each annotated regular expression will include state-based and/or transition based instructions that indicate how a specified bit, counter or other memory structure is to be initialized or updated.

Next, the resulting individual state-based and/or transition-based XFAs are combined into a single combined state-based and/or transition-based XFA that recognizes all signatures of the set simultaneously. This combined state-based and/or transition-based XFA is then supplied with an input string of network traffic so that any portions of the network traffic matching one or more of the signatures can be identified by that XFA.

Transforming a regular expression into an XFA requires striking a balance between using scratch memory to achieve the goal and using states and transitions. At one extreme, a (possibly large) DFA that uses no scratch memory can be produced. At the other extreme, a (possibly slow) program that does not rely on state information at all can be produced. There are regular expressions for which the XFA according to this invention lies at one of these extremes. For expressions such as .*s, where s is a string, it is best to use a DFA with no scratch memory at all. At the other extreme, the exemplary XFA shown in FIG. 8, which recognizes .{n}, illustrates how an XFA according to this invention can turn into a program. That is, in the XFA shown in FIG. 8, there is a single state that does not influence at all how the scratch memory is updated or when acceptance happens. When building an XFA, annotations are used to control where the resulting XFA lies along this spectrum.

There are two types of constructs that result in scratch memory objects being added to the XFA. The first, a parallel concatenation operator, which can be designated, for example, by a "#", adds a bit to the nondeterministic form of the scratch memory. In contrast, the second, an integer range, which can be designated, for example, by "{m,n}", adds a counter. The parallel concatenation operator '#' has the same semantics with respect to the language recognized as the concatenation of regular expressions. Fortunately, integer ranges, a form of syntactic sugar to the basic regular expression syntax, are already present in the signatures wherever appropriate. Thus, annotating the regular expression typically only requires deciding where to use the parallel concatenation operator '#'. In an implementation developed by the inventors, this decision is a partly manual step.

The use of the parallel concatenation operator "#" can be describe as "breaking" the regular expression into sub-expressions that resemble regular expressions that define string matching: .*s, where s is a string. Another way to describe this strategy for adding the parallel concatenation operator "#" is to add the parallel concatenation operator "#" right before sub-expressions such as ".*" and "[^\n]{300}" that repeat characters from either the whole input alphabet or a large subset of the input alphabet. Table 1 shows examples of regular expressions representing actual NIDS signatures from a test set that have been annotated with the parallel concatenation operator "#".

TABLE 1

| Signature Number | Signature text |
|---|---|
| 2667 | .*[/\\]ping\.asp |
| 3194 | .*bat"#.*& |
| 2411 | .*\nDESCRIBE\s#[^\n]{300} |
| 3466 | .*\nAuthorization:\s*Basic\s#[^\n]{200} |
| 1735 | (.*new XMLHttpRequest#.*file://)|(.*file://#.*new XMLHttpRequest) |

It should be appreciated that, when annotating the SNORT signature number 2267, no parallel concatenations are used, as the expression is sufficiently string-like. This signature will be compiled to an XFA without any scratch memory, and thus is identical to the corresponding DFA. When annotating the SNORT signature number 3466, a parallel concatenation is not inserted in front of "\s*", as the character class \s contains few characters (the white spaces). For signatures such as the SNORT signature number 1735, which is a union of subexpressions, the rules for inserting a parallel concatenation to the sub-expressions of the union are simply applied to each sub-expression separately. A parallel concatenation operator is not inserted in front of the ".*"s at the beginning of these sub-expressions, as it would actually be syntactically invalid.

In various exemplary embodiments, an XFA compiler according to this invention takes the annotated regular expressions and transforms them into deterministic XFAs. The stages are the same as for traditional DFA compilers using the Thompson construction, as disclosed in "Programming techniques: Regular expression search algorithm", K. Thompson, *Commun.ACM*, 11(6):419-422, 1968. The Thompson construction comprises parsing the regular expression, building a nondeterministic automaton through a bottom-up traversal of the parse tree, ϵ-elimination, determinization and minimization. Each of these steps is modified to handle the scratch memory and to implement new cases that handle the annotations added to the regular expressions.

One exemplary embodiment of a procedure for constructing an NXFA from the parse tree according to this invention extends the traditional steps with provisions for manipulating the data domains and the data-dependent components of the NXFAs. In various exemplary embodiments, two new steps that extend the data domain are added. In particular, in such exemplary embodiments, the step for parallel concatenation adds a bit and the step for integer ranges adds a counter. For brevity, simplified versions of these steps, which build on NFAs corresponding to the subexpressions these constructs apply to, are presented herein.

The cost that XFAs pay for these large reductions in state space is a slight increase in per-byte processing. That is, when certain states of an automaton are reached or certain transitions are traversed during matching, a corresponding small program that updates data in the scratch memory needs to be run. In experiments, the inventors have discovered that many states have either no programs associated with them or have programs that comprise just one or two instructions.

From a complexity theoretic point of view, XFAs are equivalent to DFAs since XFAs, like DFAs, use a finite amount of state. In various exemplary embodiments, this finite amount of state includes the pointer to the current state of the automaton and the scratch memory. One way to explain the large reductions in state space compared to DFAs is to view the XFA's state space as a compressed version of the DFA's state space that exploits certain regularities or redundancies in the transitions of the DFA. That is, instead of redundant states, the XFAs use the values stored in the scratch memory to differentiate between states with otherwise similar transitions. Another way to explain this large reduction in state space is by considering how the two solutions handle multiple "independent patterns" that can be interleaved arbitrarily in the input. DFAs need separate automaton states for each distinct interleaving. For example, with the two subpattern signatures presented in FIGS. 1 and 3, the order in which the subpatterns appear in the input is relevant, but the distance between them, in terms of intervening characters, is not. However, with the signatures presented in FIGS. 2 and 4, the number of characters between significant subpatterns also matters. In contrast, XFAs use separate bits and counters in scratch memory that can be updated independently. Since the state of the XFA is determined by both the automaton's state pointer and the scratch memory, working together, the XFA will still be in different states for the different interleavings it must distinguish between. However, unlike DFAs, in XFAs the differences are contained in scratch memory values rather than by using distinct automata states. Table 2 summarizes the scaling of the state space for XFAs and DFAs for the various types of signatures discussed earlier. As shown in Table 2, for many popular signature types, XFAs scale much better than DFAs as the number of signatures n grows.

TABLE 2

| Type of signatures tracked | DFA size number of states | XFA size | |
|---|---|---|---|
| | | number of states | scratch memory |
| .*abcd | O(n) | O(n) | 0 |
| .*a.*b | O($2^n$) | O(n) | O(n) |
| .*a.*b and .*abcd | O($n2^{n/2}$) | O(n) | O(n) |
| .*\na[ \n]{k} | O(nk) | O(n) | O(log(k) + log(n)) |
| .*\na[ \n]{k} and .*abcd | O($n^2$k) | O(n) | O(log(k) + log(n)) |

Because XFAs extend DFAs, methods (i.e., algorithms) for combining and matching DFAs must be adapted to properly process XFAs. By definition, XFAs have all of the components of DFAs, such as, for example, states, transition functions, a start state, and accepting states. XFAs then extend a scratch memory that can be updated via simple instructions attached to the states. In various exemplary embodiments, the instructions are restricted to manipulation of scratch memory and raising alerts although this can also be permitted. In the following exemplary embodiments, the instructions consume no input and induce no state changes.

In the following exemplary embodiments, the instructions include instructions to manipulate three kinds of structures that can be provided in the scratch memory: bits, counters, and offset counters, which are a specialized form of counters. An additional instruction type, called an "alert", is used to signal matched rules and does not manipulate the memory. It should be appreciated that, in various exemplary embodiments, instructions include an instruction type, an id, and an operation, which is represented textually as a three element list. Each distinct bit, counter, and offset counter is assigned a unique location in scratch memory that is referenced by the id value contained in the associated instructions. For example, the instruction [bit,3,set( )] has a bit type and sets bit 3 in the scratch memory when executed. It should be appreciated that the set of instructions outlined herein is not fixed or set in stone. Any kinds of instructions that may be desired or useful can be defined for a given implementation of an XFA according to this invention. The instructions defined above and in the following paragraphs are exemplary only, and thus a subset of those that could be used, but are not intended to be complete or definitive.

Instances of bits, counters, and offset counters become active in scratch memory when they are set and go inactive when they are reset, as described below. Manipulating an active instance changes its data in scratch memory, whereas manipulating an inactive instance is a no-operation (no-op) CPU operation. In various exemplary embodiments, all data structures in scratch memory are initially inactive.

In various exemplary embodiments, instructions are fully composable, meaning that they can be arbitrarily nested, subject to proper syntax and semantic rules. This composability is naturally seen in operations that test a counter or bit value: if the test evaluates to true, then a consequent, which is itself just another instruction, is executed. Table 3 provides a concise summary of each instruction.

TABLE 3

| Type & Operation | Description | Sample Usage |
|---|---|---|
| bit set | sets a bit to 1 | [bit, id, set ( )] |
| bit reset | resets a bit to 0 | [bit, id, reset ( )] |
| bit test | test & exec consequent | [bit, id, test (consequent)] |
| ctr set | sets init value, max value, and consequent | [ctr, id, set (max, consequent)] |
| ctr reset | invalidates a ctr | [ctr, id, reset ( )] |
| ctr incr | increment, compare to max, and exec consequent | [ctr, id, incr ( )] |
| offset ctr set | insert entry on offset List | [off, id, set (max, consequent)] |
| offset ctr reset | remove entry from List | [off, id, reset ( )] |
| alert | raise an alert | [alert, rule_id] |

The "bit" type instruction provides operations for setting, clearing, and testing bit values stored in scratch memory. The "set( )" instruction sets the designated bit to 1 and marks it as active. The "reset( )" instruction sets the bit to 0 and marks it as inactive. The "test(consequent)" instruction tests the value of the designated bit.

In the exemplary XFA shown on FIG. 3, state L of FIG. 3 contains the instruction [bit,1,set( )], while state M contains the instruction [bit,1,test([alert,sig1])]. The specified "consequent" instruction will be executed if and only if the bit has value 1. Counter instructions likewise manipulate numeric values that can be set, reset, and incremented.

The "set(max,consequent)" instruction initializes a counter to 0 and marks the counter as active. The maximum value "max" is stored in the counter's data structures along with the "consequent" instruction that will be executed if the counter reached is the "max" value.

The "reset( )" instruction resets a counter, marking it as inactive.

The "incr( )" instruction performs an increment-and-test operation. For an active counter, the "incr( )" instruction increments a counter's value and tests the new value against the maximum value supplied in the "set( )" operation. If the new value matches the specified "max" value, the consequent instruction (also supplied in the set operation) is executed. For inactive counters, a "no operation" is performed. Table 3 shows that the id field contains a valid numeric instance id. consequents, which are simply instructions themselves.

Referring back to the state-based XFAs shown in FIG. 4, rewriting the instructions shown in FIG. 4, the state L contains [ctr,1,reset( )], the state M contains the instruction [ctr,1,set (200,[alert,sig1])], and state K contains the instruction [ctr,1, incr( )]. It should be appreciated that, even though the counter is incremented in the start state K, the counter is initially inactive. Thus, regardless of how long this XFA remains in state K, the increment instruction has no effect until the counter is activated in the state M.

It should be appreciated that, in various exemplary embodiments, there is a slight asymmetry between the counter operation and the bit operation. For example, the consequent for the bit type is provided in the test( ) operation. In contrast, the consequent is given in the set( ) operation for counters. This reflects a conscious design decision that leads to simpler programs and enhances the optimizations described below.

The "offset counter" type instruction is a variation of the counter type instruction described above. Whereas counters are incremented by an explicit invocation of the incr( ) operation, offset counters are incremented each time a byte is read from the input. Offset counters can be implemented as counters with incr( ) operations on all (or most of) the states, but this leads to a large numbers of instructions, for example, on subpatterns with repetition count specifiers (e.g., [^\n]{200}). Instead, in various exemplary embodiments, offset counters are treated as a distinct type and provide an alternate implementation that is more efficient without changing counter semantics.

The "set(max, consequent)" instruction marks the offset counter as active and specifies the maximum offset value "max" relative to the current matching offset at which point the consequent is executed.

The "reset( )" instruction inactivates the offset counter.

When activated via the set( ) instruction, the offset counter values increment on every input symbol until the maximum value "max" is reached. At that point, the associated "consequent" instruction specified on the counter instruction associated with the current state is executed. Increased efficiency over standard counters comes from the elimination of explicit "incr( )" instructions and the use of an auxiliary list that maintains offset counter values and provides efficient access to them.

As shown in FIG. 4, counters can be replaced with offset counters to reduce program size. In this case, the state L contains the instruction "[off,1,reset( )]", the state M contains the instruction "[off,1,set(200,[alert,sig1])]", and the start state K contains no instruction.

The "alert"-type instruction simply raises an alert. As shown in Table 3, unlike the other types of instructions that can be associated with a state, the "alert"-type instruction contains only a rule id and the alert identifier.

Data structures for each type of data, i.e., bits, counters and the like, require minimal amounts of scratch memory. The bit data structure requires only a simple bit of memory, while a counter needs 12 bytes of memory, to store the current and maximum values and a consequent pointer, and an offset counter needs 8 bytes, to store the maximum value and consequent pointer. This counter data structure can be optimized to reduce its memory requirements to 8 bytes, by initializing the counter to the max value and counting down to 0 instead of initializing the counter to zero (the default situation) and testing to determine if the specified max value has been reached.

FIG. 10 shows one exemplary embodiment of a method or algorithm for combining two XFAs. FIG. 11 shows one exemplary embodiment of a method or algorithm for matching an XFA against a packet payload or a buffer of bytes. In particular, FIGS. 10 and 11 are pseudocode representations of these methods or algorithms. In FIG. 10, each state in the combined machine represents a pair of states, one from each original machine. Instructions are copied from old states to the new "paired" states.

The method or algorithm shown in FIG. 11 is similar to that for matching DFAs to packet payloads, with a few notable exceptions. First, as with the Aho-Corasick string matching method, the payload is applied to the XFA until it is exhausted, not just until a match occurs. Second, instructions attached to a given state S must be executed whenever that state S is reached, which is performed by the "execInstrs" function specified in the pseudocode shown in FIG. 11 at lines 2 and 5.

As specified in lines 6-8 of the pseudocode shown in FIG. 11, the offset counter values must be checked to determine if the max value has been reached each time a new byte is read. In various exemplary embodiments, an auxiliary list, the "offsetList", is used to hold the offset counter values in sorted order. If the value at the head of the "offsetList" matches the current offset (i), then the "consequent" associated with the current state is executed and the offset list entry is removed. In the implementation shown in FIG. 11, checking the offset list and the "reset( )" operation complete in O(l) time, while the "associated with the current status set( )" operation completes in O(m) time, where m is the number of active offset counters. Alternate implementations, such as timing wheels can be used to reduce the O(m) traversal costs.

Raising an alert (e.g., recognizing a signature) is an instruction in XFAs, so no explicit acceptance check is necessary. If an alert needs to be raised, it is processed identically to any other instruction.

The method or algorithm for combining two XFAs is performed offline prior to the signature matching method shown in FIG. 11. In the method or algorithm shown in FIG. 10, each state in the combined machine corresponds to an ordered pair of states in the first and second input machines, respectively. In line 5 of the pseudocode shown in FIG. 10, the start state of the combined machine initializes a worklist. In line 15, each newly created state adds to this worklist. The method or algorithm shown in FIG. 10 iterates until the worklist is empty, when all combined states have been created and processed. Since the number of states in the two input machines is finite, the method or algorithm must terminate.

Lines 13 and 14 of the pseudocode shown in FIG. 10 add instructions to combined states from their original counterparts. For each state that is formed by combining the states s and t, i.e., q=<s, t>, in a combined machine c, the instructions from states s and t are simply copied into the state q. The correctness of this follows from the fact that entering state q when matching machine c is equivalent to entering states s and t of the two original machines simultaneously, implying that the instructions in both states s and t need to be executed. It should be appreciated that reduction in state space requirements comes from the XFA representation itself and not from the combination method or algorithm, which is a modification of the classic method or algorithm for combining DFAs. During combination, it is likely that distinct XFAs will use the same id numbers in instructions. Although not shown, in the exemplary embodiment shown in FIG. 10, the method algorithm first scans through each XFA to be added and relabels all ids already in use.

Some of the XFAs that have been used were manually constructed. The automated methods used to build other XFAs rely on heuristics that are not formally proven to preserve the semantics of the regular expressions used to specify the signatures. Thus, a method or algorithm for determining whether XFAs correctly implement the semantics of signatures is desirable. A reference DFA, $DFA_{ref}$, is used in this process. This reference DFA is constructed from the signature using provably correct methods. The equality of the languages recognized by the XFA and $DFA_{ref}$ are tested by converting the XFA into a DFA, $DFA_{equiv}$, which can be compared against $DFA_{ref}$ using well known techniques.

It should be appreciated that, in the formal definition of an XFA set forth above, some aspects of pattern matching are simplified to keep the presentation short. For example, the data domain is treated as an opaque set and the fact that the scratch memory has more structure (e.g., semantically meaningful bits and counters) are ignored. Also, for XFAs designed for the IPS signature matching task described herein, the actual signature matching algorithm gives the number of the rule that was matched when a given state produces an alarm, not just a binary accept/reject decision. It should also be appreciated that the goal of signature matching in IPSes is not to determine whether a string representing a packet or a protocol field matches the known signature, but to determine whether any prefix of the string matches. This is achieved by moving lines 6 and 7 from FIG. 12 inside the loop.

Combining all signatures from a particular protocol into a single machine allows the signatures to be analyzed in parallel, but it can result in XFAs that have large numbers of instructions per state and/or per transition, affecting program size and runtime performance. In the worst case, if each individual signature contains a bit, counter, or offset counter and/or other data structure, then the combined XFA may have states and/or transitions with program sizes equal to the number of signatures.

Fortunately, in some scenarios, two logically distinct bits or counters can be reduced to a single bit or counter. For example, if one counter is active in some set of states and/or transitions and another counter is active in a disjoint set of states and/or transitions, then the two counters can share the same scratch memory without interference. In general, this leads to reduced scratch memory requirements and, potentially, smaller programs. This scenario is analogous to the register assignment problem in compilers, where multiple variables can share the same register as long as they cannot be simultaneously "live".

The inventors have developed techniques to automatically identify such independent counters and combine them. These optimizations are actually stronger than in the example above; in some cases, two counters can be reduced to one even if they are active in an overlapping set of states and/or transitions. These techniques apply equally to bits, counters, offset counters, and other appropriate data structures, although for presentation purposes the focus of the following discussion is on counters.

Figure 13:
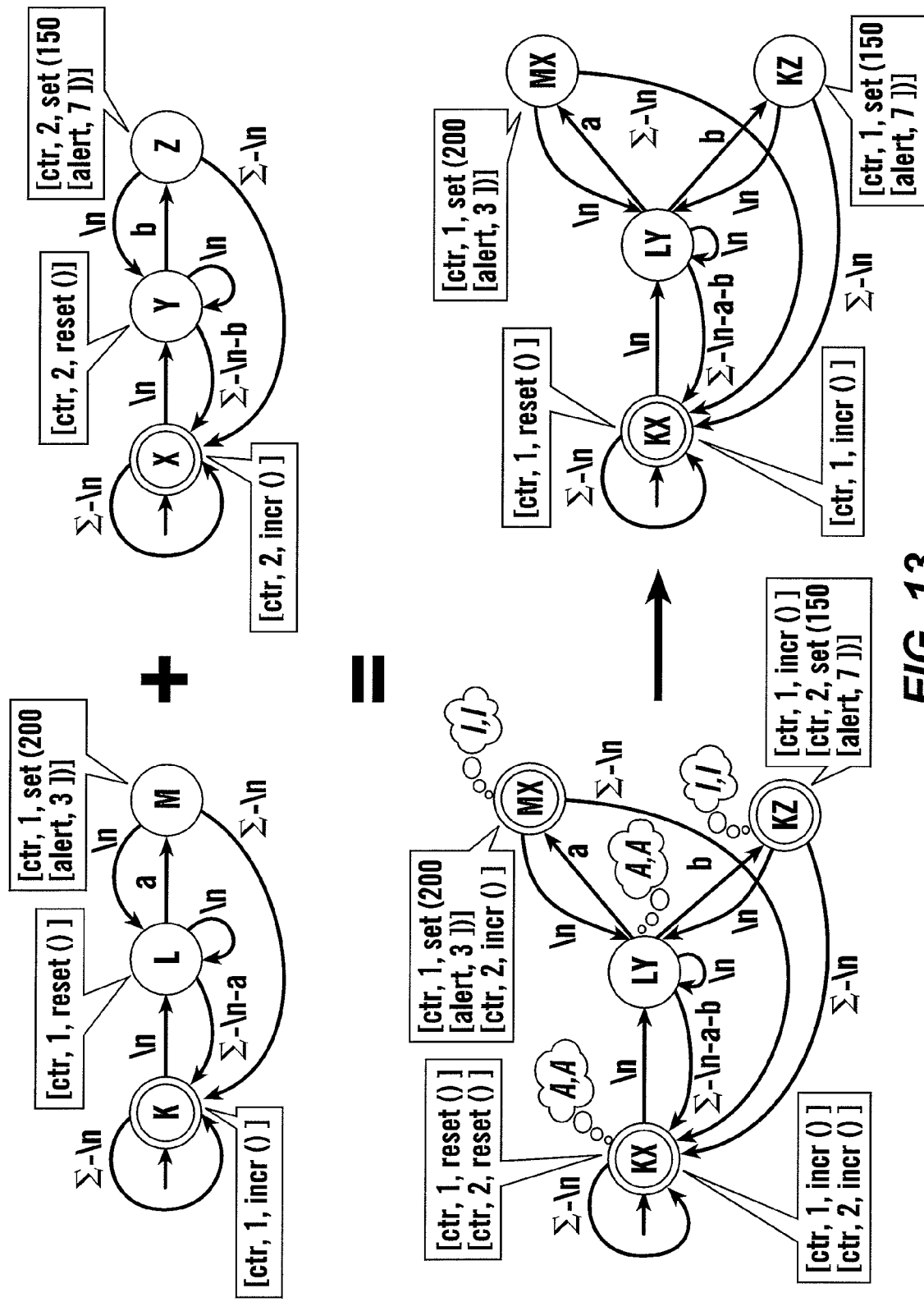
FIG. 13 shows one exemplary embodiment of a method according to this invention for counter minimizing applied to XFAs for signatures .*\na[^\n]{200} and .*\nb[^\n]{150}.

At a high level, the goal of optimization is to identify pairs of counters whose operations are compatible at each state and/or transition in the XFA. This is achieved through a two-step process. The first step performs a dataflow analysis to determine the states and/or transitions at which a counter is active. The second step uses this information to iteratively find and combine independent counters. This process is illustrated using the example shown in FIG. 13. The leftmost automata in FIG. 13 depict two distinct state-based XFAs corresponding to the regular expressions ".*\na[^\n]{200}" and ".*\nb[^\n]{150}", adapted from FIG. 4, that are combined to give the state-based XFA in the middle of FIG. 13. It should be appreciated that the "cloud" annotations refer to a later stage. In the end, optimization determines that the two counters in the combined state-based XFA are independent and reduces them to one counter.

Determining whether two counters are reducible to one requires that, for each counter C and for each state and/or transition S, a determination be made whether the counter C is active in a given state and/or transition S or not. The analysis requires a precise definition of active and inactive counters:

Definition 3. Let Q be the set of states containing a set operation for a counter C. Then, the counter C is active at the state and/or transition S if there is at least one sequence of input symbols forming a path of states and transitions from a state in the "setting" set of states and/or transitions Q to the state and/or transitions S in which no state and/or transition in the path contains a reset operation for the counter C. Otherwise, the counter C is inactive.

In other words, the counter C is active at the state and/or transition S if and only if there exists at least one input sequence ending at the state and/or transition S containing a set but no subsequent reset for the counter C. The term "activity" refers to the active or inactive status of a counter.

Counter activity is a dynamic (runtime) property, but optimization is performed statically, so the analysis must return correct results for all possible runtime inputs. Thus, the definition above refers to counters that "may be active", depending on the input provided.

The counter C's activity can be determined at each state by applying a dataflow analysis to the XFA, which results in an activity assignment of the counter C that is consistent with the definition above. In a dataflow analysis, a counter's actual value is abstracted away from and conclusions are drawn based only on the counter's activity, not the actual values it may contain. Let the counter C' be the abstract counter obtained from the counter C. The counter C' takes on values from the domain {active,inactive} and its value is referred to as a dataflow fact. Dataflow analyses produce sound and conservative facts for each counter at each state and/or transition that represent the best information about runtime behavior that can be obtained statically. Facts are obtained by iterating over the states and/or transitions using a fixed-point algorithm until a solution is reached.

In the exemplary embodiment shown in FIG. 13, the counter minimization process has been applied to the state-based XFAs for the signatures ".*\na[^\n]{200}" and ".*\nb[^\n]{150}". As shown in FIG. 13, the optimization results in eliminating one of the original counters.

The dataflow analysis is a forward-flow "may" analysis that determines whether counters are definitely inactive or "may" be active at a state and/or transition. The initial value for a fact is inactive. The value lattice orders counter facts. Inactive is the initial value for facts. The top ($\tau$) and bottom ($\bot$) nodes are implicit.

In a dataflow analysis, flow functions define the effects that instructions have on the facts for each counter. Flow functions for this analysis are defined as follows for the abstracted counter C':

$$f_{set}(C') \rightarrow \text{Active } f_{incr}(C') \rightarrow C'$$

$$f_{reset}(C') \rightarrow \text{Inactive } f_{test}(C') \rightarrow C'$$

For the "init" and "reset" operations, C' becomes active and inactive, respectively. The "incr" and "test" operations do not change the value of C'. The "test" operation is used for bit optimization.

In FIG. 13, the annotations in the middle state-based XFA show the activity of each counter at each state after the dataflow analysis has completed. Both counters are inactive when the state MX is reached, because all paths to the state MX pass through the state LY, which resets both counters. Similarly, the counters are active in the state KX because there is a path from the state MX that sets counter 1, making it active, and a path from the state KZ that sets counter 2 making it active.

It should be appreciated that two counters or other appropriate data structures can be reduced to one if they are compatible at all states and/or transitions in the automaton. Two counters or other appropriate data structures are compatible at a single state and/or transition S if their operations and activity status can be combined without changing the semantics of either counter or other appropriate data structures associated with that state and/or transition.

TABLE 4

|  |  | Inactive | | Active | | | |
|---|---|---|---|---|---|---|---|
|  |  | r, i, p | set | reset | set | incr | pres |
| Inactive | r, i, p | r, i, p | set | reset | set | incr | pres |
|  | set | set | NC | set | NC | NC | NC |
| Active | reset | reset | set | reset | set | NC | NC |
|  | set | set | NC | set | NC | NC | NC |
|  | incr | incr | NC | NC | NC | incr | NC |
|  | pres | pres | NC | NC | NC | NC | pres |

TABLE 5

|  |  | Inactive | | Active | | | |
|---|---|---|---|---|---|---|---|
|  |  | r, t, p | set | reset | set | test | pres |
| Inactive | r, t, p | r, i, p | set | reset | set | test | pres |
|  | set | set | set | set | NC | test | NC |
| Active | reset | reset | set | reset | set | NC | NC |
|  | set | set | set | set | set | NC | NC |
|  | test | test | NC | NC | NC | NC | NC |
|  | pres | pres | NC | NC | NC | NC | pres |

Table 4 shows one exemplary embodiment of a counter compatibility matrix that summarizes state-wise compatibility for all possible counter and activity combinations. Similarly, Table 5 shows one exemplary embodiment of a bit compatibility matrix that specifies which bit operations are compatible at a state and what the surviving operation is.

In the counter compatibility matrix, the "preserve" column handles the cases in which a counter has no associated instruction in the state in question. The "r,i,p set" inactive column coalesces the entries for the "reset", "increment", and "preserve" operations, which have identical behavior for inactive counters. If two operations are compatible, the corresponding entry holds the operation that could survive when the counters are combined. "NC" indicates that operations are not compatible.

Active counter operations are incompatible with most other operations, whereas inactive operations are mostly compatible. One exception is inactive set operation, which transitions a counter to the active state and is therefore incompatible with most active operations.

Entries in the bottom right quadrant of Tables 4 and 5 highlight the importance of the dataflow analysis in determining compatibility. The active portion of the rightmost column handles the cases in which a state has instructions for only one counter, but the dataflow analysis determines that a second counter is also active. Combining the two counters and using the operation of the counter present at the state could change semantics of the second counter, and so the counters are deemed to be not compatible.

Figures 14, 15:
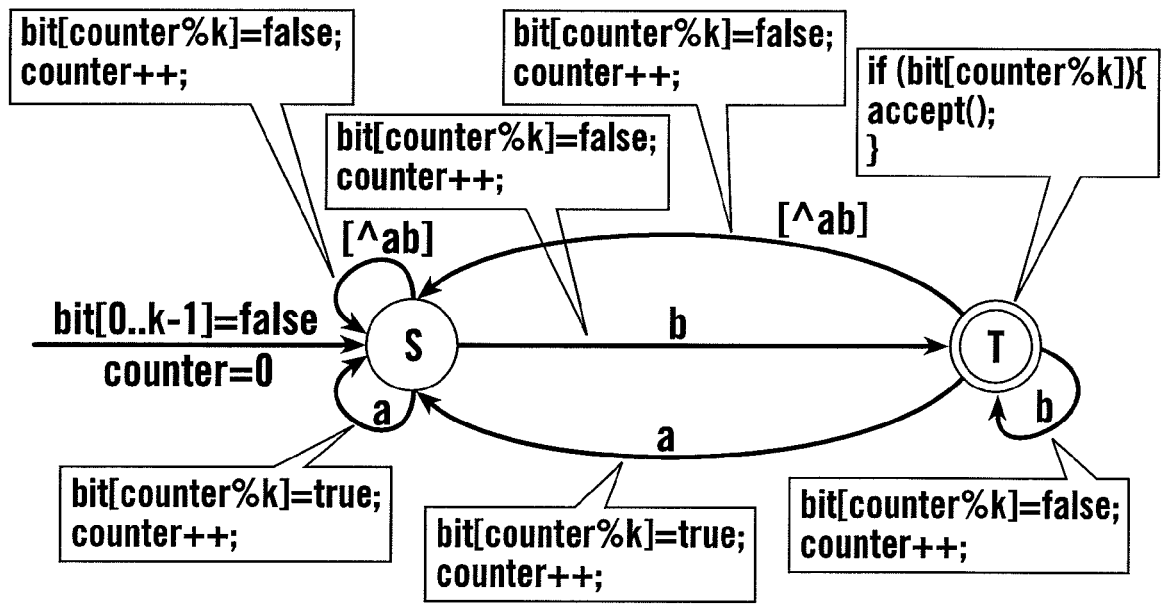
FIG. 14 shows one exemplary embodiment of a method according to this invention for determining counter compatibility.
FIG. 15 is a transition-based XFA that recognizes .*a.{n}b, where k=n+2 and illustrates the use of bitmaps in scratch memory.

FIG. 14 shows one exemplary embodiment of a pseudocode program that implements, for state-based XFAs, an algorithm for identifying and reducing equivalent counters according to this invention. As shown in FIG. 14, in line 5 of the pseudocode, for each pair of counters, the method algorithm cycles through all states and compares the pair using the "areCompat function". The "areCompat" function extracts counter activity values and operations for a pair of counters $c_1$ and $c_2$ at a given state s and invokes the counter compatibility matrix. In lines 7 and 8, the pair of counters $c_1$ and $c_2$ are marked as reducible and eligible for reduction if they are found to be compatible at all states.

Lines 9-13 perform the actual reduction for each compatible pair of counters. When a reduction results in the elimination of one or more instructions at a given state, the operation that remains is returned from the compatibility matrix via a call to the "getReduced" function.

In the exemplary embodiment shown in FIG. 13, the rightmost state-based XFA shows the combined machine after compatibility analysis has determined that counters 1 and 2 are compatible. As a result, in the combined machine, all references to counter 2 are replaced by a reference to counter 1, and irrelevant "reset" and "incr" operations are removed.

Counter optimization completes quickly, despite the seeming complexity of the methods. In the implementation illustrated in FIGS. 13 and 14, the entire optimization procedure for a single signature set typically completes in less than 10 seconds on a standard uniprocessor workstation.

The techniques described above apply directly to bits, offset counters and/or other appropriate data structure with only slight modification. Offset counters do not have explicit increment operations, so a "fake" increment instruction is just inserted in each state and/or transition for each offset counter. The procedure above is then performed, after which the increment instructions are removed. For bits, the compatibility matrix varies slightly from the counter compatibility matrix, reflecting the fact that the "consequent" for a bit is supplied in the test operation, rather than in the "set" operation, as occurs for counters.

FIG. 15 is a transition-based XFA that recognizes .*a.{n}b, where k=n+2 and illustrates the use of bitmaps in scratch memory. The XFA shown in FIG. 15 recognizes strings matching this regular expression using 2 states and k=n+2 bits of scratch memory. In contrast, DFAs must use at least 2^(n+1) states to recognize such regular expressions. If the regular expression is annotated as ".*a#.{n}b", and if the appropriate EIDD is built, this XFA can be compiled for small values of n. However, for large values of n, such an XFA is difficult to compile because the XFA represents the data domain as an explicit set and thus a typical compiler will run out of memory when determinizing the update functions. It should be appreciated that small changes to the regular expression turn it into something for which XFAs can built efficiently. For example, it is possible to recognize ".*a[^a]{n}b" with an XFA that has two states and has a data domain of size n+2 and which is used essentially as a counter.

The class of regular expression that exhibits this type of behavior also includes all expressions of the type ".*s.{m, n}", where s is a string and expressions where the character class repeating after the string includes all characters in the string. Surprisingly, dozens of such regular expressions exist among Snort's web rules, such as Rule 3519, which recognizes the regular expression ".*wqPassword=[^\r\n&]

{294}". It should be appreciated that the actual regular expression defined in Rule 3519 performs case insensitive matching.

Some simple regular expressions require a state space exponential in the size of the expression. For example, any deterministic automaton recognizing ".*a.{n}b" needs to remember which of the previous n+1 bytes in the input have been "a", so that the automaton knows whether to accept the input string or not if the automaton sees a "b" in the next n+1 input characters. DFAs must use at least $2^{n+1}$ states to be able to distinguish between the relevant inputs. An XFA according to this invention also needs at least $2^{n+1}$ distinct configurations. However, in contrast to a DFA, the distinctions between these configurations in the XFA are represented by the values stored in scratch memory, not only in the current state of the automaton.

The inventors conducted experiments to examine the memory usage and runtime performance of XFAs for real signatures. These experiments used intrusion detection signatures from both Cisco Systems and Sourcefire (makers of the popular "Snort" IPS). For each IPS source, the signatures were subdivided into their respective protocols, consistent with the behavior of many commercial IPSes. The results presented below evaluate state-based XFAs using FTP, SMTP, and subdivided HTTP signatures from both IPSes, for a total of 752 signatures spread over eight signature sets.

This evaluation compares state-based XFA performance to DFAs, NFAs, and "Multiple DFAs" (mDFAs) constructed using the algorithm given in Yu (see above). The NFAs were implemented by maintaining a frontier of states, thereby avoiding any backtracking. The mDFA implementation computes a group of combined DFAs, whose sum of sizes is guaranteed to fit into a total amount of memory supplied as a parameter. For these experiments, mDFA groups were computed for nine different memory budgets (represented as total numbers of states): 128K, 64K, 48K, 32K, 16K, 8K, 4K, 2K, and 1K total states.

These experiments demonstrated that XFAs are both space and time efficient, with memory footprints close to NFAs and processing times approaching DFAs. These experiments demonstrated that for the most complex signature sets, XFAs are both smaller and faster than mDFAs. In simpler sets, mDFAs are slightly faster but require larger memory footprints. These experiments demonstrated that for complex signature sets, optimization cuts the number of counters, offset counters, and instructions roughly in half. These experiments demonstrated that relative XFA performance improves with increasing signature set complexity, suggesting that XFAs may scale well to increasingly complex signature sets.

The XFAs created from the signatures were combined into a single XFA per signature set using the XFA COMBINE method outlined in FIG. 10. The optimization methods described above were then applied to the XFAs. Table 6 also summarizes the combined XFAs and the effects of optimization. Each pair of rows in Table 6 corresponds to a specific signature set and describes the combined XFA first and the optimized combined XFA second. The Machines column group of Table 6 depicts the number of bits, counters, and offset counters in the combined machine. The "Instrs per state column" group summarizes the distribution of instructions among the states, and the "Aux memory" group gives the amount of auxiliary memory needed to provide the scratch memory and to store the states' programs.

Not all signatures are created equal. Consistent with other observations, Snort rules are more complex than Cisco rules. As Table 6 shows, the combined automata for Snort manipulate many bits, counters and offset counters. In contrast, the Cisco signatures are simpler, and there is correspondingly less opportunity for XFA-specific features to reduce state space explosion. The reason for this discrepancy is protocol parsing: Cisco signatures are applied to parsed protocol fields, whereas Snort does very limited protocol parsing, which is compensated for by more complex signatures.

TABLE 6

| Ruleset | Num Sigs | Machines # states | #bits | #ctrs | #offs | Instrs per state max | avg | Aux memory (bytes) scratch | program |
|---|---|---|---|---|---|---|---|---|---|
| Snort FTP | 74 | 370 | 9 | 10 | 34 | 45 | 1.01 | 285 | 3840 |
| Snort FTP OPT | | | 8 | 4 | 2 | 6 | 0.48 | 45 | 1680 |
| Snort SMTP | 56 | 1,412 | 20 | 10 | 28 | 49 | 1.42 | 250 | 19274 |
| Snort SMTP OPT | | | 11 | 6 | 9 | 18 | 1.05 | 104 | 13612 |
| Snort HTTP | 271 | 3,068 | 90 | 0 | 12 | 30 | 0.32 | 83 | 8276 |
| Snort HTTP OPT | | | 88 | 0 | 12 | 30 | 0.32 | 83 | 8220 |
| Snort HTTP-URI | 135 | 1,701 | 8 | 1 | 3 | 9 | 1.05 | 27 | 21176 |
| Snort HTTP-URI O | | | 8 | 1 | 3 | 9 | 1.05 | 27 | 21176 |
| Cisco FTP | 31 | 323 | 17 | 0 | 1 | 15 | 1.50 | 8 | 1754 |
| Cisco FTP OPT | | | 17 | 0 | 1 | 15 | 1.50 | 8 | 1754 |
| Cisco SMTP | 96 | 2,673 | 16 | 0 | 0 | 11 | 0.46 | 2 | 9928 |
| Cisco SMTP OPT | | | 15 | 0 | 0 | 11 | 0.27 | 2 | 5704 |
| Cisco HTTP-HDR | 52 | 1,759 | 3 | 0 | 0 | 3 | 0.01 | 1 | 200 |
| Cisco HTTP-HDR O | | | 3 | 0 | 0 | 3 | 0.01 | 1 | 200 |
| Cisco HTTP | 37 | 850 | 9 | 0 | 0 | 12 | 2.08 | 2 | 14168 |
| Cisco HTTP OPT | | | 8 | 0 | 0 | 11 | 2.04 | 1 | 13864 |

Table 6 shows the statistics for combined state-based XFAs for several protocols. In each group, the second row gives the number bits, counters, and offset counters after optimization has completed.

Figure 16:
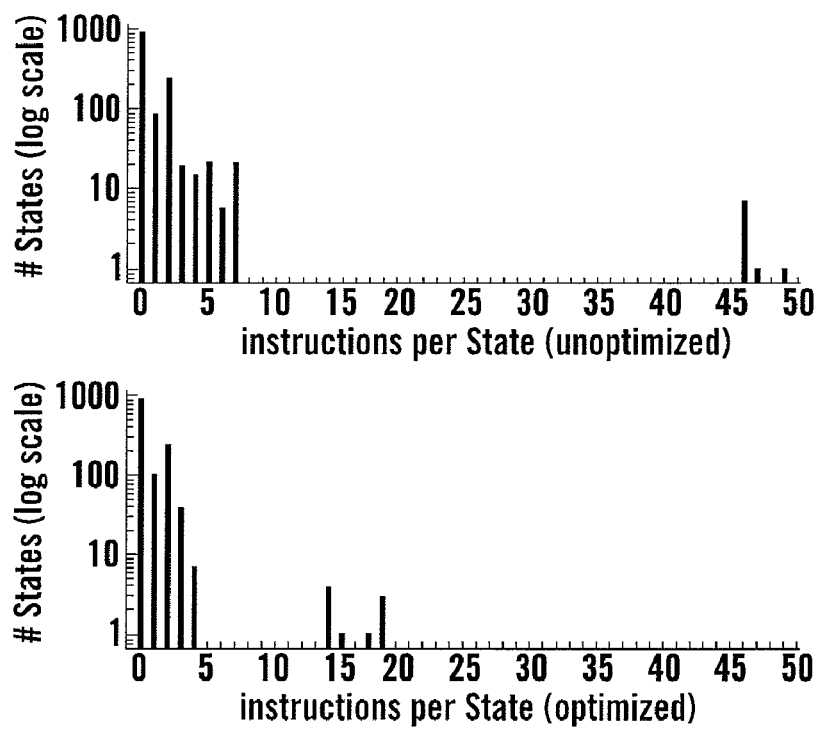
FIG. 16 shows one exemplary embodiment of a distribution of instructions in states of the Snort SMTP-combined XFA before and after optimization.
Figure 17:
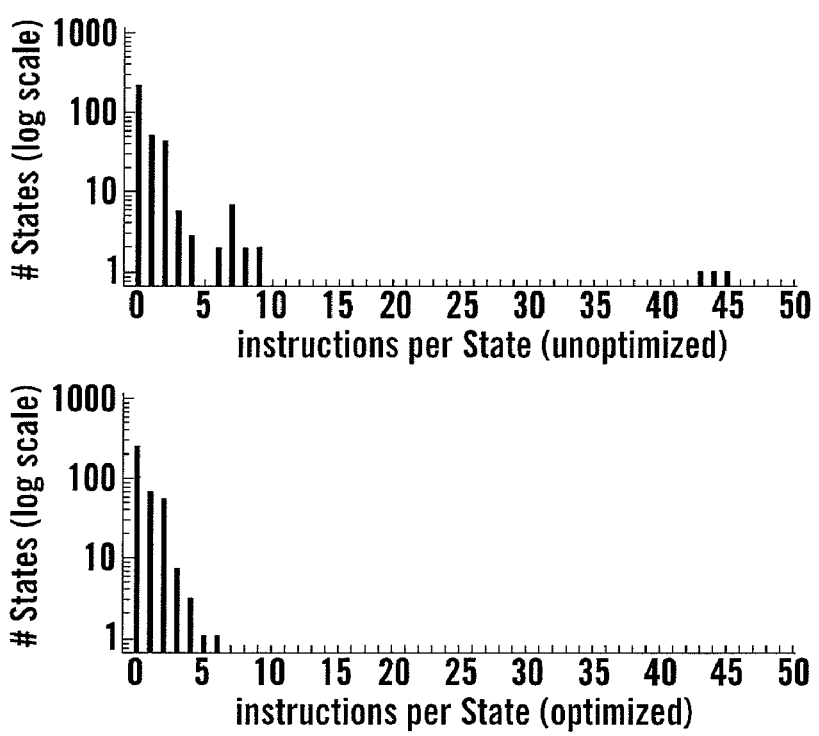
FIG. 17 shows one exemplary embodiment of a distribution of instructions in states of the Snort FTP-combined XFA before and after optimization.

For the most complex signature sets, optimization reduces the number of instructions by a factor of two. The maximum number of instructions in a single state is seven times smaller, and the scratch memory size is cut by a factor of six. FIG. 16 shows the distribution of instructions among states before and after optimization for the Snort SMTP signature set. Optimization reduces the number of instructions in a state from 8 or less in most cases to 4 or less. Some states have close to 50 instructions in them. For these states, optimization cuts the number of instructions in half. FIG. 17 shows the distribution of instructions for the Snort FTP signature set.

The principal metrics of interest in evaluating XFAs are memory usage and execution time. The above-outlined experiments were performed on a 3.0 GHz Pentium 4 Linux workstation that was otherwise idle. Runtime measurements were collected using cycle-accurate performance counters and are scaled to units of seconds/GB.

Execution time tests were performed on a 7 minute, 10 GB trace captured on the link between a university campus and a departmental network. During XFA matching, packets in the trace are filtered so that combined XFAs apply only to packets of the same protocol (e.g., combined FTP XFAs are applied only to FTP packets). XFA signature matching was performed using the method or algorithm shown in FIG. 11. NFAs and mDFAs were matched using standard state matching algorithms modified to maintain multiple state pointers.

Figure 18:
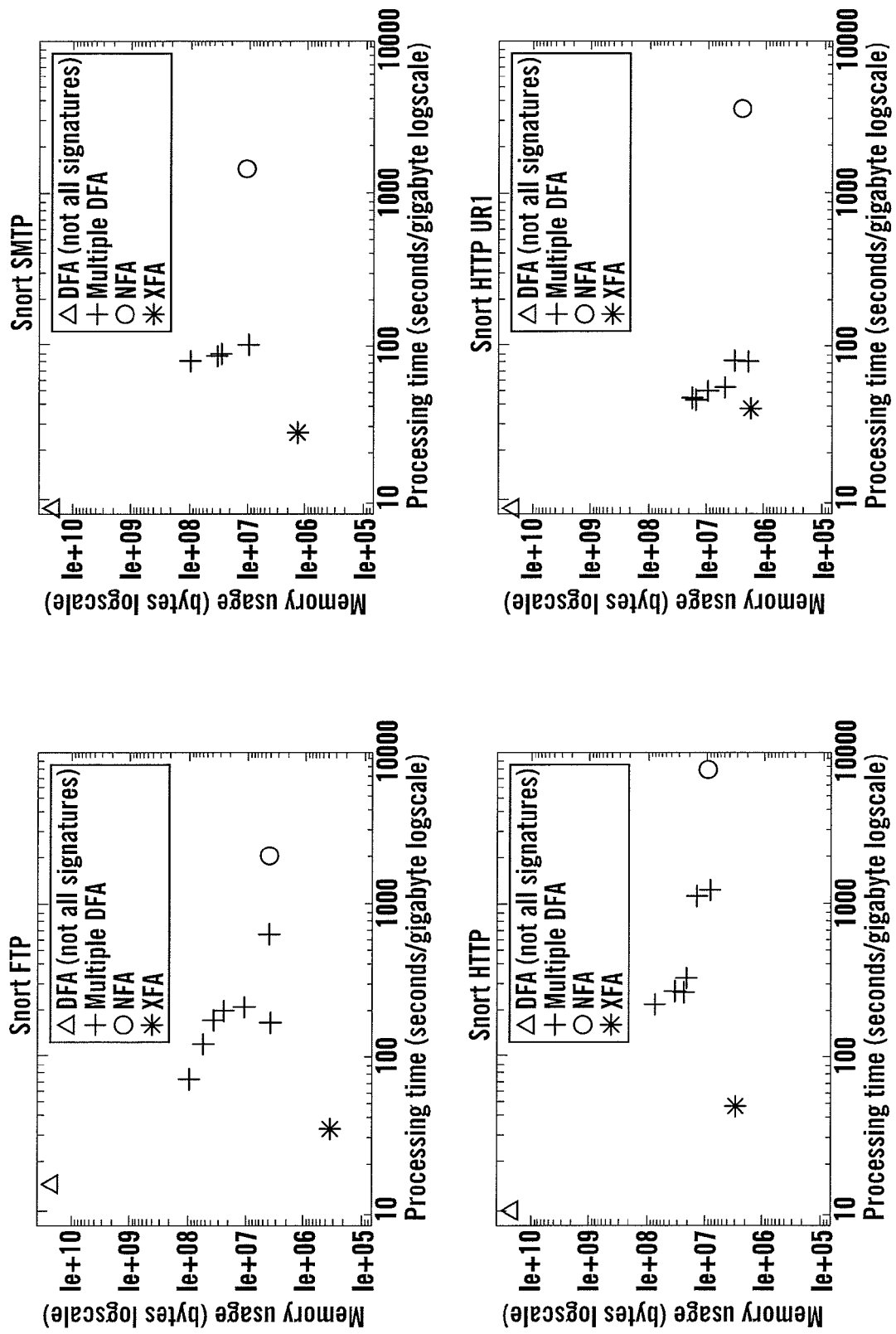
FIG. 18 shows one exemplary embodiment of the memory versus runtime tradeoffs for DFAs, mDFAs, NFAs, and XFAs for the Snort signature sets.
Figure 19:
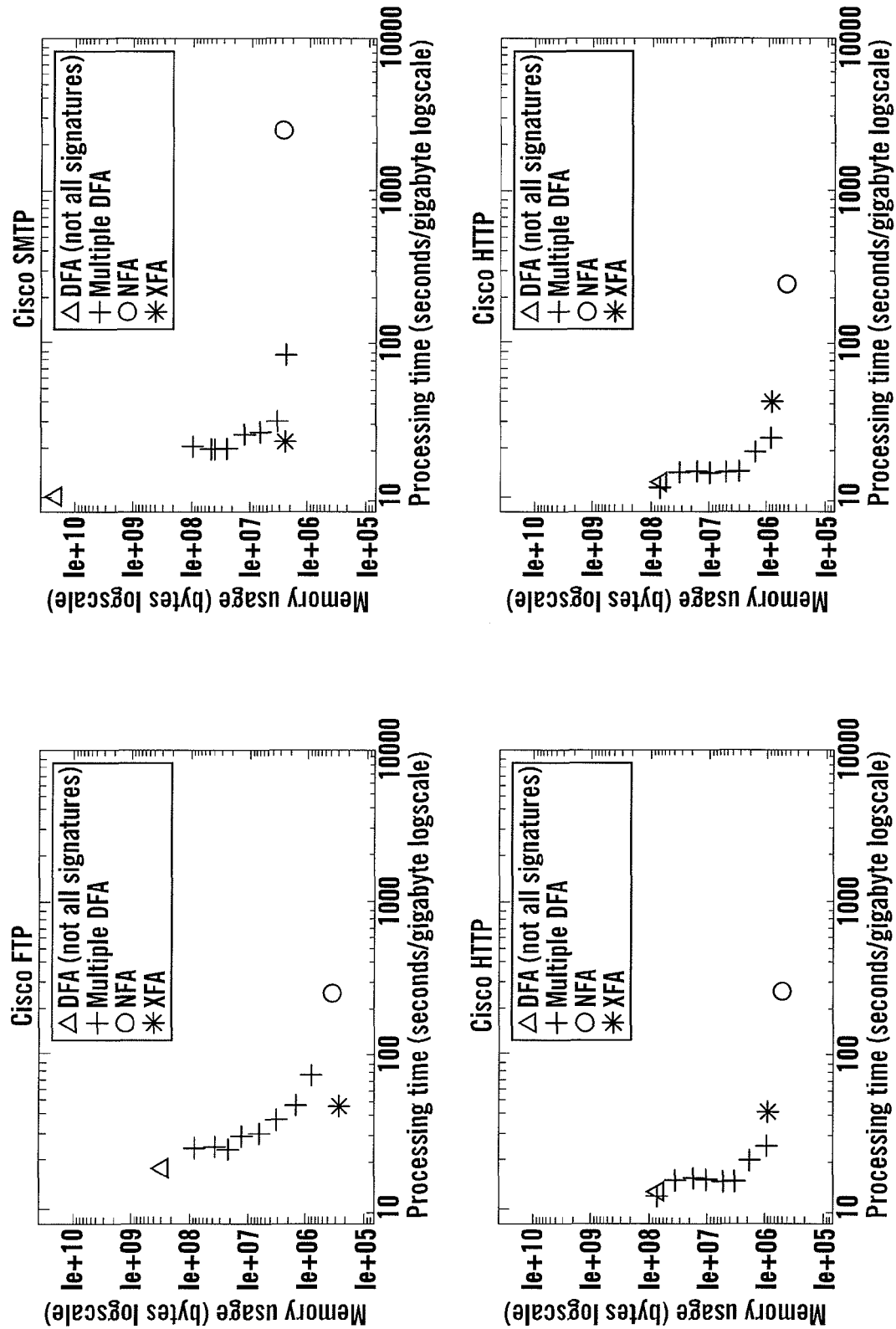
FIG. 19 shows one exemplary embodiment of the memory versus runtime tradeoffs for DFAs, mDFAs, NFAs, and XFAs for the Cisco signature sets.

FIGS. 18 and 19 provide space-time comparisons for Snort and Cisco signature sets, respectively. In each plot, the x-axis (processing time) and the y-axis (memory usage) are both presented on a log scale. Entries toward the bottom left require reduced resources (either in space or in time) and are thus preferred. DFAs and NFAs represent the extreme points at the upper left and lower right corners, respectively. It should be appreciated that, in all but one plot, the DFA point is an underestimate of the actual memory cost. The plus marks ('+') in the plot show the points for each of the nine mDFA instances. In some cases, introducing additional memory did not reduce the number of combined DFA groups, resulting in plot points that end up on top of each other. The points hint at the tradeoffs obtained through pure DFA approaches and suggest lower bounds given specific time or memory requirements.

XFAs, represented by a star, are in most cases below and to the left of the line drawn out by the DFA-based approaches, indicating that XFAs require fewer resources overall. For the Snort FTP, SMTP, and HTTP signature sets, which are among the most complex, XFAs are many times smaller and faster than mDFAs. In a less complex set, Cisco FTP, the XFA is not always the fastest, but it requires less than 50 KB of memory, which is between 10 and 100 times less memory than is required for the mDFAs. Cisco HTTP is the only case in which XFAs are less desirable over mDFAs.

Table 7 details XFA memory requirements compared to the memory requirements for DFAs, mDFAs, and NFAs, as measured in numbers of states in each automaton. With regard to memory, NFAs and DFAs show the extreme points for traditional approaches. Most entries for DFAs (the second column) are underestimates, since combining all DFAs require significantly more memory than is available. In some cases, the supplied size may be a gross underestimate: the Snort HTTP set exceeded 21.8 million states after only the first 88 signatures (out of 271) were combined.

The prototype XFAs used in these experiments stored transition tables as an array of state pointers. Actual memory requirements for DFA subsets, mDFAs, and NFAs are obtained by multiplying the number of states by 1024 (256 pointers×4 bytes/pointer). For combing DFAs, a compressed state implementation was used that reduced state sizes by approximately 50%. The combination algorithm was executed on a 64-bit machine with 16 GB of memory. XFA memory requirements are computed similarly, except that scratch and program memory sizes from Table 6, albeit small, must also be added. It should be appreciated each result represents a single protocol. An IPS would need to simultaneously fit machines in memory for each protocol it examines.

The mDFA entries in the table represent the memory requirements for three different memory budgets: 128K states, 32K states, and 8K states. In each column, the parenthesized number gives the number of DFA groups produced by the grouping heuristic presented in Yu. Because the heuristic does not do a global optimization, it is possible that the number of resulting groups does not always decrease even when the amount of available memory is increased, as is the case for the Cisco FTP and Cisco SMTP sets.

The number of mDFA groups echoes the differences in signature set complexity. At the maximum allowed memory setting, Snort signature sets still require many groups (4, 11, and 23, respectively), whereas the Cisco rules can be combined into considerably smaller numbers of groups (2, 3, and 1).

The NFA entries are the "sum of states" for each signature set and represent, in some sense, the minimal number of states required to represent all the signatures. Even so, XFAs have fewer states in many cases. There are two reasons for this. First, signatures with repetition count specifiers, such as, for example the "([^\n]{200})" signature must use explicit states to keep track of the number of repetitions when implemented as DFAs or NFAs, whereas, with XFAs, a counter or offset counter can be used instead that tracks repetition values inside the scratch memory. Second, when signatures with common prefixes are combined, only a single sequence of states is needed to match the prefix for either signature.

TABLE 7

| Signature set | DFA # States | mDFA States | | | NFA # States | XFA # States |
| --- | --- | --- | --- | --- | --- | --- |
| | | 128K | 32K | 8K | | |
| Snort FTP | >21,800,000 | 94,288(4) | 24,777(16) | 3,935(17) | 4,077 | 370 |
| Snort SMTP | >21,800,000 | 98,236(11) | 9,667(15) | 9,667(15) | 9,834 | 1,412 |
| Snort HTTP | >21,800,000 | 73,988(23) | 21,468(31) | 8,672(50) | 9,076 | 3,068 |
| Snort HTTP-URI | >21,800,000 | 17,193(4) | 15,256(4) | 4,828(6) | 2,436 | 1,701 |
| Cisco FTP | 3,431,667 | 83,162(2) | 22,254(2) | 6,318(3) | 344 | 323 |
| Cisco SMTP | >21,800,000 | 100,474(3) | 26,263(3) | 6,659(4) | 2,666 | 2,673 |
| Cisco HTTP-HDR | 8,242 | 8,242(1) | 8,242(1) | 4,947(2) | 1,429 | 1,759 |
| Cisco HTTP | 69,765 | 69,765(1) | 16,985(2) | 5,423(2) | 496 | 850 |

TABLE 8

| Signature set | DFA Exec | mDFA Runtime | | | NFA Exec | XFA Exec |
| --- | --- | --- | --- | --- | --- | --- |
| | | 128K | 32K | 8K | | |
| Snort FTP | 15.0 | 71.1(4) | 196.2(16) | 164.1(17) | 2,084.8 | 33.6 |
| Snort SMTP | 8.8 | 80.5(11) | 101.0(15) | 101.3(15) | 1,442.4 | 26.7 |
| Snort HTTP | 10.1 | 214.6(23) | 316.6(31) | 1,169.3(50) | 7,158.3 | 46.6 |
| Snort HTTP-URI | 11.9 | 42.8(4) | 41.7(4) | 49.3(6) | 3,300.8 | 36.3 |
| Cisco FTP | 18.1 | 24.7(2) | 24.3(2) | 30.6(3) | 240.5 | 45.5 |
| Cisco SMTP | 10.4 | 21.5(3) | 35.9(3) | 26.3(4) | 2,549.8 | 23.0 |
| Cisco HTTP-HDR | 13.7 | 12.4(1) | 12.4(1) | 15.3(2) | 1,164.3 | 15.7 |
| Cisco HTTP | 12.6 | 11.6(1) | 14.8(2) | 14.7(2) | 254.5 | 41.5 |

Table 8 compares runtimes for DFAs, mDFAs, NFAs, and state-based XFAs, as measured in second/GB. In particular, Table 8 compares XFA runtime performance to the other mechanisms, showing quantitative results for the same mDFA data points provided in the memory comparison. As expected, the combined DFA subsets are fastest since they perform the least amount of work per byte. In these exemplary embodiments, this work includes just a transition table lookup and pointer dereference. In contrast, NFAs are the slowest, since the per-byte cost of a DFA is multiplied, roughly, by the number of machines in the protocol group. mDFA runtimes fall between the extremes, in which execution time increases follow the number of groups.

For the most complex Snort sets, XFAs are at least twice as fast as mDFAs, even when mDFAs have 250 times more memory. For the Cisco signature sets, which are simpler, mDFAs are often faster but require more memory as shown in the plots in FIG. 18. For example, in the Cisco SMTP set the XFA outperforms the mDFA set with one-third less memory, and requires about one-tenth the memory of a faster mDFA. When both memory and CPU resources are constrained, as is the case for signature matching, XFAs have a distinct advantage.

While this invention has been described in conjunction with the exemplary embodiments outlined above, various alternatives, modifications, variations, improvements and/or substantial equivalents, whether known or that are or may be presently foreseen, may become apparent to those having at least ordinary skill in the art. Accordingly, the exemplary embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The invention claimed is:

1. A pattern matching method, executing on a data processing system having a controller and a memory, for recognizing one of a plurality of predefined patterns in a data stream received by the data processing system using a recognition network, the recognition network comprising a plurality of nodes, a plurality of transitions connecting the nodes and an amount of memory usable to store node external data of at least one of at least one bit data element, at least one counter data element and at least one other data structure the node external data being other than the data used to record a node state and rules for transitions between nodes, at least some of the nodes including at least one instruction for interacting with the node external data, the method comprising:

inputting a stream of data comprising a plurality of ordered data elements;

transitioning from a current node of the recognition network to a next node of the transition network, the next node being one of the current node and another node of the recognition network, based on a next one of the plurality of ordered data elements of the stream of data applied to the rules for transitions between nodes;

entering the next node;

executing, upon entering the next node, if the next node includes at least one instruction for interacting with the node external data that instruction;

determining, based upon executing the at least one instruction on the node external data, if an acceptance condition has been met; and outputting, if the acceptance condition has been met and a given node entered, an alert indicating that the acceptance condition has occurred.

2. A pattern matching method, executing on a data processing system having a controller and a memory, for recognizing one of a plurality of predefined patterns in a data stream received by the data processing system using a recognition network, the recognition network comprising a plurality of nodes, a plurality of transitions connecting the nodes and an amount of memory usable to store node external information about the data stream, at least some of the nodes including at least one instruction for interacting with the stored node external information, the node external data being other than the data used to record a node state and rules for the transitions between nodes, the method comprising:

inputting a stream of data comprising a plurality of ordered data elements;

transitioning from a current node of the recognition network to a next node of the transition network over a transition linking the current node to the next node, the next node being one of the current node and another node of the recognition network, based on a next one of the plurality of ordered data elements of the stream of data applied to the rules for transitions between nodes;

entering the next node;

executing, upon at least one of traversing the transition and entering the next node, if at least one of the transition and the next node includes at least one instruction for interacting with at least one portion of the stored node external information, that at least one instruction;

determining if an acceptance condition associated with the next node has been met based on the entry of a given node and the execution of the at least one instruction; and outputting, if the acceptance condition has been met, an alert indicating that the acceptance condition has occurred.

3. The method of claim 2, wherein the node external data of the amount of memory stores at least one data structure, each data structure associated with at least one of at least one transition and at least one node.

4. The method of claim 3, wherein the at least one data structure includes at least one single-bit data element.

5. The method of claim 3, wherein the at least one data structure includes at least one multi-bit data element.

6. The method of claim 3, wherein the at least one data structure includes at least one bytemap data element.

7. The method of claim 3, wherein the at least one data structure includes at least one counter data element.

8. The method of claim 2, wherein executing, upon at least one of traversing the transition and entering the next node, if at least one of the transition and the next node includes at least one instruction for interacting with at least one portion of the stored node external information, that at least one instruction, comprises:
   executing, upon entering the next node, if the next node includes at least one instruction for interacting with at least one portion of the stored information, that at least one instruction.

9. The method of claim 8, wherein executing, upon entering the next node, if the next node includes at least one instruction for interacting with at least one portion of the stored node external information, that at least one instruction comprises executing at least one of an instruction for updating at least one of the at least one portion of the stored node external information and an instruction for comparing at least one of the at least one portion of the stored node external information to an acceptance condition.

10. The method of claim 2, wherein executing, upon at least one of traversing the transition and entering the next node, if at least one of the transition and the next node includes at least one instruction for interacting with at least one portion of the stored node external information, that at least one instruction, comprises:
    executing, upon traversing the transition, if the transition includes at least one instruction for interacting with at least one portion of the stored node external information, that at least one instruction.

11. The method of claim 10, wherein executing, upon traversing the transition, if the transition includes at least one instruction for interacting with at least one portion of the stored node external information, that at least one instruction comprises executing at least one instruction for updating at least one of the at least one portion of the stored node external information.

12. The method of claim 10, wherein executing, upon at least one of traversing the transition and entering the next node, if at least one of the transition and the next node includes at least one instruction for interacting with at least one portion of the stored node external information, that at least one instruction, further comprises:
    executing, upon entering the next node, if the next node includes at least one instruction for interacting with at least one portion of the stored node external information, that at least one instruction.

13. The method of claim 12, wherein executing, upon entering the next node, if the next node includes at least one instruction for interacting with at least one portion of the stored node external information, that at least one instruction comprises executing at least one instruction for comparing at least one of the at least one portion of the stored node external information to an acceptance condition.

14. A recognition network, executable on a data processing system having a controller and a memory, usable to recognize one of a plurality of predefined patterns in a stream of data, comprising a plurality of ordered data elements, received by the data processing system, the recognition network comprising:
    a plurality of nodes;
    a plurality of transitions connecting the nodes; and
    an amount of memory storing node external information about the stream of data, the node external data being other than the data used to record a node state and rules for transitions between nodes, wherein at least one of some of the nodes and at least some of the transitions include at least one instruction for interacting with the stored node external information;
    wherein for each node having at least one instruction, each such instruction comprises one of an instruction for updating at least one of the at least one portion of the stored node external information and an instruction for comparing at least one of the at least one portion of the stored node external information to an acceptance condition indicating a pattern matching with the stream of data.

15. The recognition network of claim 14, wherein, in response to receiving a next one of the ordered data elements, the recognition network:
    transitions from a current node of the recognition network to a next node of the transition network over a transition linking the current node to the next node and associated with the next one of the ordered data elements, the next node being one of the current node and another node of the recognition network;
    enters the next node;
    executes, upon at least one of traversing the transition and entering the next node, if at least one of the transition and the next node includes at least one instruction for interacting with at least one portion of the stored node external information, that at least one instruction; determines if an acceptance condition associated with the next node has been met; and outputs, if the acceptance condition has been met, an alert indicating that the acceptance condition has occurred.

16. The recognition network of claim 14, wherein the amount of memory stores at least one data structure, each data structure associated with at least one of at least one transition and at least one node.

17. The recognition network of claim 16, wherein the at least one data structure includes at least one single-bit data element.

18. The recognition network of claim 16, wherein the at least one data structure includes at least one multi-bit data element.

19. The recognition network of claim 16, wherein the at least one data structure includes at least one bytemap data element.

20. The recognition network of claim 16, wherein the at least one data structure includes at least one counter data element.

21. The recognition network of claim 14, wherein for each transition having at least one instruction, each such instruction comprises an instruction for updating at least one of the at least one portion of the stored node external information.

* * * * *